US012021291B2

(12) United States Patent
Meng

(10) Patent No.: US 12,021,291 B2
(45) Date of Patent: Jun. 25, 2024

(54) High-Q MULTI-MODE DIELECTRIC RESONANT STRUCTURE AND DIELECTRIC FILTER

(71) Applicants: WUGUANG SYSTEM COMPANY LIMITED, Hong Kong (CN); ACCULA ELECTRONIC TECHNOLOGIES PTE. LTD, Singapore (SG); AVALEN INFO SYSTEM TECHNOLOGIES COMPANY LIMITED, Vancouver (CA)

(72) Inventor: Qingnan Meng, Hong Kong (CN)

(73) Assignees: WUGUANG SYSTEM COMPANY LIMITED, Hong Kong (HK); ACCULA ELECTRONIC TECHNOLOGIES PTE LTD, Singapore (SG); AVALEN INFO SYSTEM TECHNOLOGIES COMPANY LIMITED, Vancouver (CA)

( * ) Notice: Subject to any disclaimer, the term of this patent is extended or adjusted under 35 U.S.C. 154(b) by 12 days.

(21) Appl. No.: 17/799,687

(22) PCT Filed: May 28, 2021

(86) PCT No.: PCT/CN2021/096886

§ 371 (c)(1),
(2) Date: Aug. 14, 2022

(87) PCT Pub. No.: WO2022/028068

PCT Pub. Date: Feb. 10, 2022

(65) Prior Publication Data

US 2024/0030582 A1 Jan. 25, 2024

(30) Foreign Application Priority Data

Aug. 7, 2020 (CN) ........................ 202010792917.5

(51) Int. Cl.
*H01P 7/10* (2006.01)
*H01P 1/20* (2006.01)
(Continued)

(52) U.S. Cl.
CPC ............ *H01P 7/105* (2013.01); *H01P 1/2002* (2013.01); *H01P 1/2086* (2013.01); *H01P 3/16* (2013.01)

(58) Field of Classification Search
CPC .... H01P 7/105; H01P 7/10; H01P 7/00; H01P 1/20; H01P 1/2002; H01P 1/201;
(Continued)

(56) References Cited

U.S. PATENT DOCUMENTS 4,623,857 A * 11/1986 Nishikawa ............ H01P 1/2086 333/219.1
5,200,721 A 4/1993 Mansour
(Continued)

FOREIGN PATENT DOCUMENTS

CN 108336459 A 7/2018
CN 109411852 A 3/2019
(Continued)

OTHER PUBLICATIONS

The extended European Search report of the corresponding EP patent application No. 21853164.8, mail date Aug. 3, 2023.

*Primary Examiner* — Stephen E. Jones
(74) *Attorney, Agent, or Firm* — Samson G. Yu

(57) ABSTRACT

Disclosed are a high-Q multi-mode dielectric resonant structure and a dielectric filter. The high-Q multi-mode dielectric resonant structure includes a cavity, a dielectric support frame, a dielectric resonator and a cover plate, and the cavity is formed by a sealed space, herein one surface of the cavity is a cover plate surface; the dielectric resonator is formed by a medium; and the dielectric support frame is mounted in
(Continued)

any positions between the dielectric resonator and an inner wall of the cavity, matched with any shapes of the dielectric resonator and the cavity and fixed by connecting, and the ratio of the dimension of the inner wall of the cavity to the corresponding dimension of the dielectric resonator corresponding to three axial directions thereof is between 1.01-4.5. Embodiments of the present invention may solve a scheme that the filter is small in volume, low in insertion loss, and high in suppression, and may form a multi-mode, and a Q value is greater than that of a traditional dielectric multi-mode technology.

24 Claims, 4 Drawing Sheets

(51) Int. Cl.
*H01P 1/208* (2006.01)
*H01P 3/16* (2006.01)

(58) Field of Classification Search
CPC ...... H01P 1/207; H01P 1/2082; H01P 1/2084; H01P 1/2086; H01P 3/16
See application file for complete search history.

(56) References Cited

U.S. PATENT DOCUMENTS

| | | | | |
|---|---|---|---|---|
| 6,762,658 | B1 * | 7/2004 | Isomura .................. | H01P 7/105<br>333/219.1 |
| 2014/0320239 | A1 | 10/2014 | Park et al. | |

FOREIGN PATENT DOCUMENTS

| | | | |
|---|---|---|---|
| CN | 109411853 | A | 3/2019 |
| EP | 1014474 | A1 | 6/2000 |
| JP | Y58007681 | Y2 | 2/1983 |
| JP | H11145705 | A | 5/1999 |
| JP | 2001237608 | A | 8/2001 |
| JP | 2005065040 | A | 3/2005 |
| WO | 2019109335 | A1 | 6/2019 |

* cited by examiner

High-Q MULTI-MODE DIELECTRIC RESONANT STRUCTURE AND DIELECTRIC FILTER

TECHNICAL FIELD

Embodiments of the present invention relate to the field of communication technologies, in particular to a high-Q multi-mode dielectric resonant structure and a dielectric filter.

BACKGROUND

Dielectric resonators may be traced back to the late 1930s, but due to the low level of processes and technologies at that time, a high dielectric constant material with low enough loss in a microwave frequency band could not be developed, so the dielectric resonator could not be promoted and applied. Until the 1960s, due to the progress of material science and technologies, it becomes possible to develop a microwave dielectric material with the low loss and high dielectric constant. At the same time, due to the development of space technologies, the requirements for the high reliability and miniaturization of electronic devices become more and more urgent. Therefore, researches on the dielectric resonator are revived again. In the 1970s, the United States, Japan and other countries successively develop several ceramic dielectric-series materials that meet the performance requirements successfully. Since then, the dielectric resonator is really used in microwave circuits as a new microwave element. Now, the dielectric resonator is widely applied in various radio frequency applications, such as a filter and an antenna, by virtue of its advantages of high Q, small dimension and excellent temperature stability.

After the peak of the fourth generation (4G) construction in 2015, the existing investment in communication networks by operators in the mobile communication industry shows a gradually reduced trend, but the demands of end users are rapidly increased year by year towards a direction of the better coverage, more data traffic, and greater communication bandwidth, and the entire communication industry calls for a lower-cost solution scheme. At the same time, the commercialization of a fifth generation (5G) technology also puts forward the higher requirements for the volume, weight and cost of the filter. As an important constituent part of a communication antenna feed system, the filter is a key device that may not be avoided. How to achieve the better performance, lower weight, and smaller volume under the condition of a lower cost is a problem that filter suppliers need to solve in the face of market challenges.

With the rapid development of the fourth generation mobile communication to the fifth generation mobile communication, the requirements for the miniaturization and high performance of the communication device are higher and higher. The traditional filter is gradually replaced by a single-mode dielectric filter due to its large metal cavity and general performance. The single-mode dielectric filter mainly includes a TE01 mode dielectric filter and a TM mode dielectric filter, the TE01 mode dielectric filter and the TM mode dielectric filter generally adopt a mode of single-mode dielectric resonance. Although this resonance mode may improve a certain Q value, it has the disadvantages of high production cost and large volume.

In order to solve the technical problems of the high cost and large volume of the single-mode dielectric filter, a three-mode dielectric filter is emerged. In a related technology, the three-mode dielectric filters are generally classified into a TE three-mode filter and a TM three-mode filter. The TE three-mode filter has the characteristics of a complicated coupling mode, a large volume and a high Q value; and the TM three-mode filter has the characteristics of a simple coupling mode, a small volume and a low Q value. For the TE three-mode filter and the TM three-mode filter in the same frequency band, the weight, cost and volume of the TM three-mode filter are much smaller than those of the TE three-mode filter. Therefore, in the related technology, the TE three-mode filter is generally used to design a narrow-band filter, and the TM three-mode filter is generally used for other types of filters. Since silver is baked on a dielectric resonator block of the TM three-mode filter, a glassy-state substance is formed between a silver layer and the surface of the dielectric resonator block after the silver is baked, so that the actual conductivity is greatly decreased, and the actual Q value is lower, this further limits a scope of the use of the TM three-mode filter. Therefore, how to obtain a TM three-mode filter with small volume and high Q value is a new direction of filter research and development.

A high-Q multi-mode technology applies the filter to a base station system, it may reduce the volume of a Radio Remote Unit (RRU) by 40%, and at the same time reduce the power consumption of the RRU by 10%, so it is more environment-friendly. While the performance index of the multi-mode technology filter is the same as that of the traditional filter, the volume may be greatly reduced by more than 50%.

SUMMARY

In order to solve the above problems, embodiments of the present invention provide a high-Q multi-mode dielectric resonant structure and a dielectric filter, it may solve a scheme of small volume, low insertion loss, and high suppression of a filter, and may form a multi-mode, and the Q value is greater than a traditional dielectric multi-mode technology.

The present invention discloses a high-Q multi-mode dielectric resonant structure, including a cavity, a dielectric support frame, a dielectric resonator and a cover plate; the cavity is formed by a sealed space, herein one surface of the cavity is a cover plate surface; the dielectric resonator is formed by a medium; the dielectric resonator is mounted in the cavity without contacting an inner wall of the cavity; the dielectric support frame is mounted in any positions between the dielectric resonator and the inner wall of the cavity, matched with any shapes of the dielectric resonator and the cavity and fixed by connecting, herein the dielectric resonator includes an integrated dielectric resonator or a split dielectric resonator formed by a plurality of split small dielectric resonant blocks and fixed by connecting blocks, herein the cavity is internally provided with one single axial cylindrical or polygonal dielectric resonator and the fixed dielectric support frame thereof to form a multi-mode dielectric resonant structure with the cavity; or the cavity is internally provided with two vertically intersected cylindrical or polygonal single axial dielectric resonators and the fixed dielectric support frame thereof to form a multi-mode dielectric resonant structure with the cavity, herein the X-axis dimension of the cylindrical or polygonal dielectric resonator on a X-axis direction is greater than or equal to the perpendicular dimension, parallel to a X-axis, of the cylindrical or polygonal dielectric resonator with a Y-axis; and herein the Y-axis dimension of the cylindrical or polygonal dielectric resonator on a Y-axis direction is greater than or equal to the perpendicular dimension, parallel to the Y-axis, of the cylindrical or polygonal dielectric resonator with the X-axis; or the cavity is internally provided with three mutually vertically intersected cylindrical or polygonal single axial dielectric resonators and the fixed dielectric support frame thereof to form a multi-mode dielectric resonant structure with the cavity, herein the X-axis dimension of the cylindrical or polygonal dielectric resonator on the X-axis direction is greater than or equal to the perpendicular dimensions, parallel to the X-axis, of the cylindrical or polygonal dielectric resonator with the Y-axis and the cylindrical or polygonal dielectric resonator with a Z-axis; wherein the Y-axis dimension of the cylindrical or polygonal dielectric resonator on the Y-axis direction is greater than or equal to the perpendicular dimensions, parallel to the Y-axis, of the cylindrical or polygonal dielectric resonator with the X-axis and the cylindrical or polygonal dielectric resonator with the Z-axis; and herein the Z-axis dimension of the cylindrical or polygonal dielectric resonator on a Z-axis direction is greater than or equal to the perpendicular dimensions, parallel to the Z-axis, of the cylindrical or polygonal dielectric resonator with the X-axis and the cylindrical or polygonal dielectric resonator with the Y-axis, while the dielectric resonant structure is the one single axial dielectric resonator, the two vertically intersected single axial dielectric resonators, or the three mutually vertically intersected single axial dielectric resonators, the dielectric resonator is trimmed, slotted and chamfered in the horizontal and vertical directions, so that the dimension of the inner wall of the cavity thereof and the dimension of the dielectric resonator corresponding to the three axial directions are changed or the dimensions in the horizontal and vertical directions are changed, so as to change frequencies of a fundamental mode and a plurality of high-order modes and the corresponding number of multi-modes and Q value, while the dielectric resonant structure is the two vertically intersected single axial dielectric resonators or the three mutually vertically intersected single axial dielectric resonators, and the dimension of the cylindrical or polygonal dielectric resonator on any one axial direction is less than the perpendicular dimension, parallel to the axial direction, of the cylindrical or polygonal dielectric resonators with the other one or two axial, the frequencies of the corresponding fundamental mode and the plurality of the high-order modes thereof and the corresponding number of multi-modes and the Q value may be changed accordingly, while the frequency of the fundamental mode is kept unchanged, the high-Q multi-mode dielectric resonant structure formed by the dielectric resonators with different dielectric constants, the cavity and the dielectric support frame, and the Q value and the number of the multi-mode corresponding to the frequencies of the fundamental mode and the plurality of the high-order modes may be changed, the changes of the Q values of the dielectric resonators with the different dielectric constants are different, and the frequency of the high-order mode may also be changed, the ratio of the dimension of the inner wall of the cavity to the dimension of the dielectric resonator corresponding to the three axial directions thereof or the ratio of the dimensions in the horizontal and vertical directions is between 1.01-4.5, wherein a change relationship of the Q value change with the ratio 1.01-4.5 of the dimension of the inner wall of the cavity to the dimension of the dielectric resonator corresponding to the three axial directions thereof or with the ratio 1.01-4.5 of the dimensions in the horizontal and vertical directions is that the Q value is directly proportional to the change of the dimension ratio or the Q value is proportional to the change of the dimension ratio and the Q value has a larger change near a certain ratio, and the changes of the multi-mode Q values corresponding to the different frequencies are different near a certain ratio.

In a preferred embodiment of the present invention, herein the cavity is internally provided with one single axial cylindrical or polygonal dielectric resonator and the fixed dielectric support frame thereof to form a multi-mode dielectric resonator with the cavity, a center of an end face of the dielectric resonator is close to or coincided with a position, corresponding to a center of an inner wall surface, of the cavity, the dielectric resonator thereof is trimmed, slotted and chamfered in the horizontal and vertical directions, the inner wall dimension of the cavity and the dimension of the dielectric resonator corresponding to the three axial directions are changed or the dimensions in the horizontal and vertical directions are changed, it may change the Q value and the number of multi-mode corresponding to the frequencies of the fundamental mode and the plurality of the high-order modes and the corresponding multi-mode number and Q value, while the X-axis, Y-axis, and Z-axis dimensions of the inner wall of the cavity are changed, the X-axis, Y-axis, and Z-axis dimensions of the dielectric resonator corresponding to the inner wall of the cavity may also be changed accordingly while at least one desired frequency is kept unchanged, the cavity is internally provided with two vertically intersected single axial cylindrical or polygonal dielectric resonators and the fixed dielectric support frame thereof to form a multi-mode dielectric resonant structure with the cavity, the center of the end face of the dielectric resonator is closed to or coincided with the position, corresponding to the center of the inner wall surface, of the cavity, herein the X-axis dimension of the cylindrical or polygonal dielectric resonator on the X-axis direction is greater than or equal to the perpendicular dimension, parallel to the X-axis, of the cylindrical or polygonal dielectric resonator with the Y-axis; wherein the Y-axis dimension of the cylindrical or polygonal dielectric resonator on the Y-axis direction is greater than or equal to the perpendicular dimension, parallel to the Y-axis, of the cylindrical or polygonal dielectric resonator with the X-axis; and the dielectric resonator is trimmed, slotted and chamfered in the horizontal and vertical directions, the inner wall dimension of the cavity thereof and the dimension of the dielectric resonator corresponding to the three axial directions are changed or the dimensions in the horizontal and vertical directions are changed, so as to change the Q value and the number of multi-mode corresponding to the frequencies of the fundamental mode and the plurality of the high-order modes, while the X-axis, Y-axis and Z-axis dimensions of the inner wall of the cavity is changed, the X-axis, Y-axis and Z-axis dimensions of the dielectric resonator corresponding to the inner wall of the cavity may also be changed accordingly while a desired frequency is kept unchanged, the cavity is internally provided with three mutually vertically intersected single axial cylindrical or polygonal dielectric resonators and the fixed dielectric support frame thereof to form a multi-mode dielectric resonant structure with the cavity, the center of the end face of the dielectric resonator is close to or coincided with the position, corresponding to the center of the inner wall surface, of the cavity, herein the X-axis dimension of the cylindrical or polygonal dielectric resonator on the X-axis direction is greater than or equal to the perpendicular dimensions, parallel to the X-axis, of the cylindrical or polygonal dielectric resonator with the Y-axis and the cylindrical or polygonal dielectric resonator with the Z-axis; wherein the Y-axis dimension of the cylindrical or polygonal dielectric resonator on the Y-axis direction is greater than or equal to the perpendicular dimensions, parallel to the Y-axis, of the cylindrical or polygonal dielectric resonator with the X-axis and the cylindrical or polygonal dielectric resonator with the Z-axis; herein the Z-axis dimension of the cylindrical or polygonal dielectric resonator on the Z-axis direction is greater than the perpendicular dimensions, parallel to the Z-axis, of the cylindrical or polygonal dielectric resonator with the X-axis and the cylindrical or polygonal dielectric resonator with the Y-axis; and the dielectric resonator is trimmed, slotted and chamfered in the horizontal and vertical directions, the dimension of the inner wall of the cavity thereof and the dimension of the dielectric resonator corresponding to the three axial directions are changed or the dimensions in the horizontal and vertical directions are changed, it may change the Q value and the number of multi-mode corresponding to the frequencies of the fundamental mode and the plurality of the high-order modes, while the X-axis, Y-axis, and Z-axis dimensions of the inner wall of the cavity are changed, the X-axis, Y-axis, and Z-axis dimensions of the dielectric resonator corresponding to the inner wall of the cavity may also be changed accordingly while a desired frequency is kept unchanged, and the ratio of the dimension of the inner wall of the cavity to the dimension of the dielectric resonator corresponding to the three axial directions thereof or the ratio of the dimensions in the horizontal and vertical directions is between 1.01-4.5.

In a preferred embodiment of the present invention, herein the one single axial dielectric resonant structure or the two vertically intersected single axial dielectric resonant structures or the three mutually vertically intersected single axial dielectric resonant structures may be through-slotted or blind-slotted along any axis, plane, slope and diagonal, and may be cut into different numbers of small dielectric resonator blocks, and the small dielectric resonator blocks may be fixed to form a dielectric resonator through dielectric or metal connecting block, or it may be blind-cut so that the dielectric resonator is integrally connected between the adjacent small dielectric resonator blocks, a slot width of a through slot and a blind slot is larger, the influence thereof on the frequency, the Q value and the mode number is greater, and the slot width is smaller, the influence thereof on the frequency, the Q value and the mode number is smaller, while the connecting block is made of metal, the Q value of the formed split dielectric resonator may be greatly reduced, while the ratio of the dimension of the inner wall of the cavity to the dimension of the dielectric resonator corresponding to the three axial directions thereof or the ratio of the dimensions in the horizontal and vertical directions is between 1.01-4.5, the mode number corresponding to the frequencies of the fundamental mode and the high-order mode is 1-N, the multi-mode Q value corresponding to the different frequencies of the fundamental mode and high-order mode may be changed, and the dielectric resonator with different dielectric constants may affect the change of the frequency, the Q value, and the mode number thereof, while the dimension ratio between the cavity and one axial dielectric resonator or the other one or two axial dielectric resonators or three axial dielectric resonators is changed, the corresponding fundamental mode and multi-mode number, the frequency, and the Q value may also be changed accordingly.

In a preferred embodiment of the present invention, herein in the one single axial dielectric resonant structure or the two vertically intersected single axial dielectric resonant structures or the three mutually vertically intersected single axial dielectric resonant structures, while the ratio of the dimension of the inner wall of the cavity to the dimension of the dielectric resonator corresponding to the three axial directions thereof or the ratio of the dimensions in the horizontal and vertical directions is between 1.01-4.5, the Q valve and the number of the multi-mode corresponding to the frequencies of the fundamental mode and a plurality of the high-order modes may be changed, and the Q values of the dielectric resonators with the different dielectric constants are different, wherein the change relationship of the Q value change with the ratio 1.01-4.5 of the dimension of the inner wall of the cavity to the dimension of the dielectric resonator corresponding to the three axial directions thereof or with the ratio 1.01-4.5 of the dimensions in the horizontal and vertical directions is that the Q value is directly proportional to the dimension change of the dimension ratio or the Q value is proportional to the change of the dimension ratio and the Q value has a larger change near certain specific ratios, and the changes of the multi-mode Q values corresponding to the different frequencies are different near certain specific ratios, while the dimension ratio between the cavity and one axial dielectric resonator or the other one or two axial dielectric resonators or three axial dielectric resonators is changed, the corresponding fundamental mode Q value may also be changed accordingly.

In a preferred embodiment of the present invention, herein in the one single axial dielectric resonant structure or the two vertically intersected single axial dielectric resonant structures or the three mutually vertically intersected single axial dielectric resonant structures, while the ratio of the dimension of the inner wall of the cavity to the dimension of the dielectric resonator corresponding to the three axial directions thereof or the ratio of the dimensions in the horizontal and vertical directions is between 1.01-4.5, while the fundamental mode frequency thereof is kept unchanged, the high-order mode frequency and the fundamental mode frequency, and an interval between the frequencies of the plurality of the high-order modes may be changed for many times, and the changes of the interval of the frequencies of the dielectric resonators with the different dielectric constants are different, while the dimension ratio between the cavity and one axial dielectric resonator or the other one or two axial dielectric resonators or three axial dielectric resonators is changed, the corresponding fundamental mode and multi-mode frequency intervals may also be changed accordingly.

In a preferred embodiment of the present invention, herein in the one single axial dielectric resonant structure or the two vertically intersected single axial dielectric resonant structures or the three mutually vertically intersected single axial dielectric resonant structures, while the ratio of the dimension of the inner wall of the cavity to the dimension of the dielectric resonator corresponding to the three axial directions thereof or the ratio of the dimensions in the horizontal and vertical directions is between 1.01-4.5, while the cavity dimension and the fundamental mode frequency are kept unchanged, and the horizontal and vertical dimensions of the three axial dimensions of the single axial dielectric resonator are changed in any combinations, the fundamental mode of the single axial dielectric resonant structure may form the 1-3 multi-modes with the same frequency or close frequencies, and the plurality of the high-order modes with the different frequencies forms 1-N multi-modes at the same frequency; the fundamental mode of the vertically intersected biaxial dielectric resonant structure and the triaxial intersected dielectric resonant structure may form 1-6 multi-modes with the same frequency or close frequencies, and the plurality of the high-order modes with the different frequencies forms 1-N multi-modes at the same frequency, while the dimension ration between the cavity and one axial dielectric resonator and the other one or two axial dielectric resonators or three axial dielectric resonators is changed, the corresponding fundamental mode and multi-mode number may also be changed accordingly.

In a preferred embodiment of the present invention, herein an edge or a sharp corner of the dielectric resonator or/and the cavity is provided with a cut side to form adjacent coupling, and the cavity and the dielectric resonator is cut into a triangle or a quadrilateral, or partial or whole edge cutting is performed at the edge of the cavity or the dielectric resonator, the cavity and the dielectric resonator are side-cut at the same time or side-cut separately, and after the adjacent coupling is formed by the side-cutting, the frequency and the Q value may be changed accordingly, and the adjacent coupling may also affect cross coupling thereof.

In a preferred embodiment of the present invention, herein a sharp corner position at the intersection of three surfaces of the cavity corresponding to the one single axial dielectric resonator or the two vertically intersected single axial dielectric resonators or the three mutually vertically intersected single axial dielectric resonators is corner-cut and/or the cavity is corner-cut and closed to form cross coupling, and the corresponding frequency and Q value may also be changed accordingly, and it may also affect the adjacent coupling.

In a preferred embodiment of the present invention, herein at least one tuning device is arranged in a position in which the field strength of the dielectric resonator is concentrated.

In a preferred embodiment of the present invention, herein the shape of the cavity corresponding to the one single axial dielectric resonant structure or the two vertically intersected single axial dielectric resonant structures or the three mutually vertically intersected single axial dielectric resonant structures includes at least one of the following: a cuboid, a cube, and a polygon, and the inner wall surface of the cavity or a part of an inner region may be provided with a concave or a convex or a cut corner or a slot.

In a preferred embodiment of the present invention, herein the cavity material is metal or non-metal, and the surfaces of the metal and non-metal are electro-plated with copper or electro-plated with silver.

In a preferred embodiment of the present invention, herein the cross-sectional shape of the one single axial dielectric resonator or the two vertically intersected single axial dielectric resonators or the three mutually vertically intersected single axial dielectric resonators includes at least one of the following: a cylinder, an ellipsoid, and a polygon.

In a preferred embodiment of the present invention, herein the surface or the inner region of the dielectric resonator may be partially provided with a concave or a convex or a cut corner or a slot or an edge.

In a preferred embodiment of the present invention, herein the one single axial dielectric resonator or the two vertically intersected single axial dielectric resonators or the three mutually vertically intersected single axial dielectric resonators are solid or hollow.

In a preferred embodiment of the present invention, herein the dielectric resonator material is a ceramic, a composite dielectric material, or a dielectric material with a dielectric constant greater than 1.

In a preferred embodiment of the present invention, herein the dielectric support frame is located at the end face, the edge, and the sharp corner of the dielectric resonator or the sharp corner of the cavity, and is placed between the dielectric resonator and the cavity, the dielectric resonator is supported in the cavity by the dielectric support frame, while the dielectric support frame is mounted in different positions of the dielectric resonator, the corresponding fundamental mode and multi-mode number, the frequency and the Q value thereof may also be changed accordingly, the connecting block may connect any two or more adjacent small dielectric resonator blocks, the connecting block is located at any positions of the small dielectric resonator block, and the different numbers of the small dielectric resonator blocks may be fixed to form the dielectric resonator, and while the connecting block is located at the different positions of the dielectric resonator, the corresponding fundamental mode and multi-mode number, the frequency, and the Q value may also be changed accordingly, while the ratio of the dimension of the inner wall of the cavity to the dimension of the dielectric resonator corresponding to the three axial directions thereof or the ratio of the dimensions in the horizontal and vertical directions is between 1.01-4.5, the Q values of the fundamental mode and the high-order mode are changed for many times, while the dimension ratio between the cavity and one axial dielectric resonator or the other one or two axial dielectric resonators or the three axial dielectric resonators is changed, the frequencies of the corresponding fundamental mode and the plurality of the high-order modes and the corresponding multi-mode number and Q value may also be changed accordingly.

In a preferred embodiment of the present invention, herein the dielectric support frame and the dielectric resonator or the cavity are combined to form an integrated structure or a split structure.

In a preferred embodiment of the present invention, herein the dielectric support frame of the one single axial dielectric resonator or the two vertically intersected single axial dielectric resonators or the three mutually vertically intersected single axial dielectric resonators is made of the dielectric material, the material of the dielectric support frame is an air, plastic or ceramic, composite dielectric material, and the connecting block may be a dielectric or metal material.

In a preferred embodiment of the present invention, herein the dielectric support frame is connected with the dielectric resonator and the cavity by means of press-connecting, bonding, splicing, welding, snap-fitting or screw-fastening, and the dielectric support frame is connected to one or more end faces of the one single axial dielectric resonator or the two vertically intersected single axial dielectric resonators or the three mutually vertically intersected single axial dielectric resonators, the dielectric or metal connecting block is used to fix the cut small dielectric resonator block by means of the press-connecting, bonding, splicing, welding, snap-fitting or screw-fastening, a plurality of the small dielectric resonator blocks with arbitrary shapes is connected to form the dielectric resonator by the connecting block.

In a preferred embodiment of the present invention, herein the dielectric support frame is mounted at any positions corresponding to the dielectric resonator and the inner wall of the cavity and matched with any shapes of the dielectric resonator and the cavity and is fixed by connecting, the dielectric support frame includes a solid with two parallel surfaces or a structure of which the middle is penetrated, and the number of the dielectric support frames at the same end face or different end faces, edges and sharp corners of the dielectric resonator is one or more different combinations, and the corresponding frequencies, mode number and Q value of the different numbers of the dielectric support frame may also be different, while the ratio of the dimension of the inner wall of the cavity to the dimension of the dielectric resonator corresponding to the three axial directions thereof or the ratio of the dimensions in the horizontal and vertical directions is between 1.01-4.5, the Q values of the fundamental mode and the high-order mode may be changed for many times, the connecting block is any shapes and is matched and mounted between two or more adjacent small dielectric resonator blocks, so that the plurality of the small dielectric resonator blocks is connected and fixed to form a split dielectric resonator, and the connecting block includes a solid or a structure of which the middle is penetrated, and the number of the connecting blocks at the same end face or different end faces, edges and sharp corners of the dielectric resonator is one or more different combinations, and the corresponding frequencies, mode number and Q value of the different numbers of the connecting blocks may also be different, while the ratio of the dimension of the inner wall of the cavity to the dimension of the dielectric resonator corresponding to the three axial directions thereof or the ratio of the dimensions in the horizontal and vertical directions is between 1.01-4.5, the Q values of the fundamental mode and the high-order mode may be changed for many times, while the dimension ratio between the cavity and the one single axial dielectric resonator or the other one or two axial dielectric resonators or the three axial dielectric resonators is changed, the frequencies of the corresponding fundamental mode and the plurality of the high-order modes and the corresponding multi-mode number and Q value may be changed accordingly.

In a preferred embodiment of the present invention, herein an elastic spring sheet or an elastic dielectric material for stress relief is arranged between the dielectric support frame of the one single axial dielectric resonator or two vertically intersected single axial dielectric resonators or the three mutually vertically intersected single axial dielectric resonators and the inner wall of the cavity.

In a preferred embodiment of the present invention, herein the dielectric support frame of the dielectric resonator is in contact with the inner wall of the cavity to form heat conduction.

An embodiment of the present invention further discloses a dielectric filter of the high-Q multi-mode dielectric resonant structure, herein a single axial dielectric high-Q multi-mode dielectric resonant structure, a vertically intersected biaxial high-Q multi-mode dielectric resonant structure or a vertically intersected triaxial high-Q multi-mode dielectric resonant structure may form 1-N single pass band filters with different frequencies, and the single pass band filters with the different frequencies form a multi-pass band filter, a duplexer or an arbitrary combination of the duplexers, the corresponding high-Q multi-mode dielectric resonant structure may also be arbitrarily combined in different forms with a single-mode resonant cavity, a double-mode resonant cavity and a three-mode resonant cavity of metal or dielectric, so as to form the different dimensions of a plurality of the single pass band or multi-pass band filters or the duplexers or the multiplexers or the arbitrary combines required.

In a preferred embodiment of the present invention, herein the cavity corresponding to the single axial dielectric high-Q multi-mode dielectric resonant structure, the vertically intersected biaxial high-Q multi-mode dielectric resonant structure or the vertically intersected triaxial high-Q multi-mode dielectric resonant structure may perform arbitrary combines of adjacent coupling or cross coupling with the metal resonator single mode or multi-mode cavity, and the dielectric resonator single mode or multi-mode cavity.

The beneficial effects of the embodiments of the present invention are as follows: the embodiments of the present invention may solve the scheme of the small volume, low insertion loss, and high suppression of the filter, and may form the multi-mode, and the Q value is greater than the traditional dielectric multi-mode technology.

BRIEF DESCRIPTION OF THE DRAWINGS

In order to more clearly describe technical schemes in embodiments of the present invention or related technologies, drawings used in descriptions of the embodiments or the related technologies are briefly introduced below. Apparently, the drawings in the following description are some of the embodiments of the present invention. For those of ordinary skill in the art, other drawings may also be obtained according to these drawings without creative work.

Figure 1:
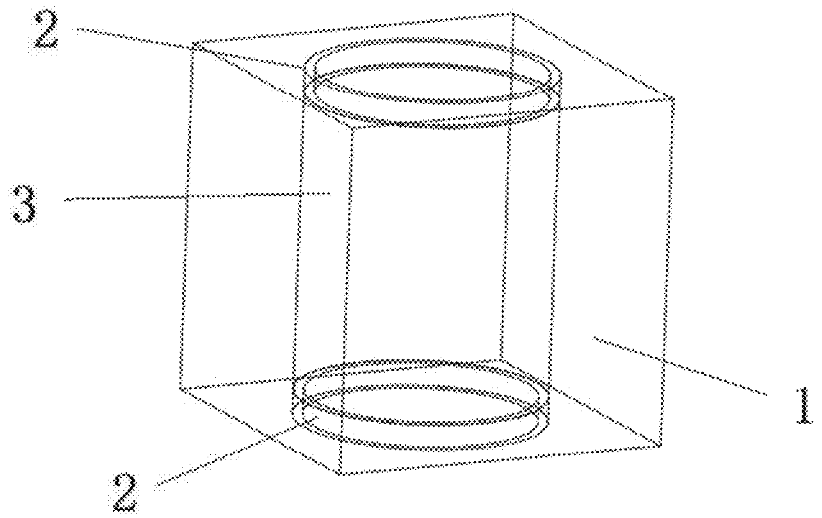
FIG. 1 is a structure schematic diagram of a single axial dielectric resonant structure of the present invention.

In the drawings: 1—Cavity; 2—Dielectric support frame; 3—Cylindrical or polygonal dielectric resonator; and 4—Slot.

DETAILED DESCRIPTION OF THE EMBODIMENTS

In order to make purposes, technical schemes and advantages of embodiments of the present invention clearer, the technical schemes in the embodiments of the present invention are clearly and completely described below with reference to the drawings in the embodiments of the present invention. Apparently, the described embodiments are a part of the embodiments of the present invention, but not all the embodiments. Based on the embodiments of the present invention, all other embodiments obtained by those of ordinary skill in the art without creative work shall fall within a scope of protection of the present invention.

In the description of the present invention, it should be understood that orientation or position relationships indicated by terms "length", "width", "upper", "lower", "front", "rear", "left", "right", "vertical", "horizontal", "top", "bottom", "inside", "outside" and the like are based on the orientation or position relationships shown in the drawings, and are only for the convenience of describing the present invention and simplifying the description, rather than indicating or implying that a referred device or element must have a specific orientation, and be constructed and operated in the specific orientation. Therefore, it may not be construed as limitation to the invention.

In addition, terms "first" and "second" are only used for descriptive purposes, and should not be construed as indicating or implying the relative importance or implying the number of technical features indicated. Thus, the feature defined as "first" or "second" may expressly or implicitly include one or more features. In the description of the present invention, "plurality" means two or more, unless otherwise expressly and specifically defined.

The embodiment of the present invention discloses a high-Q multi-mode dielectric resonant structure, including a cavity 1, a dielectric support frame 2, a dielectric resonator 3 and a cover plate; the cavity 1 is formed by a sealed space, herein one surface of the cavity 1 is a cover plate surface; the dielectric resonator 3 is formed by a medium; the dielectric resonator 3 is mounted in the cavity without contacting an inner wall of the cavity 1; the dielectric support frame 2 is mounted in any positions between the dielectric resonator 3 and the inner wall of the cavity 1, matched with any shapes of the dielectric resonator 3 and the cavity 1 and fixed by connecting, herein the dielectric resonator 3 includes an integrated dielectric resonator 3 or a split dielectric resonator 3 formed by a plurality of split small dielectric resonant blocks and fixed by connecting blocks, herein the cavity 1 is internally provided with one single axial cylindrical or polygonal dielectric resonator 3 and the fixed dielectric support frame 2 thereof to form a multi-mode dielectric resonant structure with the cavity 1; or the cavity 1 is internally provided with two vertically intersected cylindrical or polygonal single axial dielectric resonators 3 and the fixed dielectric support frame 2 thereof to form a multi-mode dielectric resonant structure with the cavity 1, herein the X-axis dimension of the X-axis cylindrical or polygonal dielectric resonator 3 is greater than or equal to the perpendicular dimension, parallel to the X-axis, of the Y-axis cylindrical or polygonal dielectric resonator; and herein the Y-axis dimension of the Y-axis cylindrical or polygonal dielectric resonator 3 is greater than or equal to the perpendicular dimension, parallel to the Y-axis, of the X-axis cylindrical or polygonal dielectric resonator 3; or the cavity 1 is internally provided with three mutually vertically intersected cylindrical or polygonal single axial dielectric resonators 3 and the fixed dielectric support frame 2 thereof to form a multi-mode dielectric resonant structure with the cavity 1, herein the X-axis dimension of the X-axis cylindrical or polygonal dielectric resonator 3 is greater than or equal to the perpendicular dimensions, parallel to the X-axis, of the Y-axis cylindrical or polygonal dielectric resonator 3 and the Z-axis cylindrical or polygonal dielectric resonator 3; herein the Y-axis dimension of the Y-axis cylindrical or polygonal dielectric resonator 3 is greater than or equal to the perpendicular dimensions, parallel to the Y-axis, of the X-axis cylindrical or polygonal dielectric resonator 3 and the Z-axis cylindrical or polygonal dielectric resonator 3; and herein the Z-axis dimension of the Z-axis cylindrical or polygonal dielectric resonator 3 is greater than or equal to the perpendicular dimensions, parallel to the Z-axis, of the X-axis cylindrical or polygonal dielectric resonator 3 and the Y-axis cylindrical or polygonal dielectric resonator 3, while the dielectric resonant structure is the one single axial dielectric resonator 3, the two vertically intersected single axial dielectric resonators 3, or the three mutually vertically intersected single axial dielectric resonators 3, the dielectric resonator is trimmed, slotted and chamfered in the horizontal and vertical directions, so that the dimension of the inner wall of the cavity 1 thereof and the dimension of the dielectric resonator 3 corresponding to the three axial directions are changed or the dimensions in the horizontal and vertical directions are changed, as to change frequencies of a fundamental mode and a plurality of high-order modes and the corresponding number of multi-modes and Q value, while the dielectric resonant structure is the two vertically intersected single axial dielectric resonators 3 or the three mutually vertically intersected single axial dielectric resonators 3, and any one axial cylindrical or polygonal dielectric resonator 3 is less than the perpendicular dimension, parallel to the axial direction, of the other one or two axial cylindrical or polygonal dielectric resonators 3, the frequencies of the corresponding fundamental mode and the plurality of the high-order modes thereof and the corresponding number of multi-modes and the Q value may be changed accordingly, while the frequency of the fundamental mode is kept unchanged, the high-Q multi-mode dielectric resonant structure formed by the dielectric resonators 3 with different dielectric constants, the cavity 1 and the dielectric support frame 2, and the dimensions of the multi-mode and the Q value corresponding to the frequencies of the fundamental mode and the plurality of the high-order modes may be changed, the changes of the Q values of the dielectric resonators 3 with the different dielectric constants are different, and the frequency of the high-order mode may also be changed, the ratio of the dimension of the inner wall of the cavity 1 to the dimension of the dielectric resonator 3 corresponding to the three axial directions thereof or the ratio of the dimensions in the horizontal and vertical directions is between 1.01-4.5, herein a change relationship of the dimension change of the Q value with the ratio 1.01-4.5 of the dimension of the inner wall of the cavity 1 to the dimension of the dielectric resonator 3 corresponding to the three axial directions thereof or the ratio 1.01-4.5 of the dimensions in the horizontal and vertical directions is that the Q value is directly proportional to the dimension change of the dimension ratio or the Q value has a larger change near a certain ratio, and the changes of the multi-mode Q values corresponding to the different frequencies are different near a certain ratio.

Herein the cavity 1 is internally provided with one single axial cylindrical or polygonal dielectric resonator 3 and the fixed dielectric support frame 2 thereof to form a multi-mode dielectric resonator with the cavity 1, a center of an end face of the dielectric resonator 3 is close to or coincided with a position, corresponding to a center of an inner wall surface, of the cavity 1, the dielectric resonator 3 thereof is trimmed, slotted and chamfered in the horizontal and vertical directions, the inner wall dimension of the cavity 1 and the dimension of the dielectric resonator 3 corresponding to the three axial directions are changed or the dimensions in the horizontal and vertical directions are changed, it may change the frequencies of the fundamental mode and the plurality of the high-order modes and the corresponding multi-mode number and Q value, while the X, Y, and Z-axis dimensions of the inner wall of the cavity 1 are changed, the X, Y, and Z-axis dimensions of the dielectric resonator 3 corresponding to the inner wall of the cavity 1 may also be changed accordingly while at least one desired frequency is kept unchanged, the cavity 1 is internally provided with two vertically intersected single axial cylindrical or polygonal dielectric resonators 3 and the fixed dielectric support frame 2 thereof to form a multi-mode dielectric resonant structure with the cavity 1, the center of the end face of the dielectric resonator 3 is closed to or coincided with the position, corresponding to the center of the inner wall surface, of the cavity 1, herein the X-axis dimension of the X-axis cylindrical or polygonal dielectric resonator 3 is greater than or equal to the perpendicular dimension, parallel to the X-axis, of the Y-axis cylindrical or polygonal dielectric resonator 3; herein the Y-axis dimension of the Y-axis cylindrical or polygonal dielectric resonator 3 is greater than or equal to the perpendicular dimension, parallel to the Y-axis, of the X-axis cylindrical or polygonal dielectric resonator 3; and the dielectric resonator 3 is trimmed, slotted and chamfered in the horizontal and vertical directions, the inner wall dimension of the cavity 1 thereof and the dimension of the dielectric resonator 3 corresponding to the three axial directions are changed or the dimensions in the horizontal and vertical directions are changed, as to change the frequencies of the fundamental mode and the plurality of the high-order modes and the corresponding multi-mode number and Q value, while the X, Y and Z-axis dimensions of the inner wall of the cavity 1 is changed, the X, Y and Z-axis dimensions of the dielectric resonator 3 corresponding to the inner wall of the cavity 1 may also be changed accordingly while a desired frequency is kept unchanged, the cavity 1 is internally provided with three mutually vertically intersected single axial cylindrical or polygonal dielectric resonators 3 and the fixed dielectric support frame 2 thereof to form a multi-mode dielectric resonant structure with the cavity 1, the center of the end face of the dielectric resonator 3 is close to or coincided with the position, corresponding to the center of the inner wall surface, of the cavity 1, herein the X-axis dimension of the X-axis cylindrical or polygonal dielectric resonator 3 is greater than or equal to the perpendicular dimensions, parallel to the X-axis, of the Y-axis cylindrical or polygonal dielectric resonator 3 and the Z-axis cylindrical or polygonal dielectric resonator 3; herein the Y-axis dimension of the Y-axis cylindrical or polygonal dielectric resonator 3 is greater than or equal to the perpendicular dimensions, parallel to the Y-axis, of the X-axis cylindrical or polygonal dielectric resonator 3 and the Z-axis cylindrical or polygonal dielectric resonator 3; herein the Z-axis dimension of the Z-axis cylindrical or polygonal dielectric resonator 3 is greater than the perpendicular dimensions, parallel to the Z-axis, of the X-axis cylindrical or polygonal dielectric resonator 3 and the Y-axis cylindrical or polygonal dielectric resonator 3; and the dielectric resonator 3 is trimmed, slotted and chamfered in the horizontal and vertical directions, the dimension of the inner wall of the cavity 1 thereof and the dimension of the dielectric resonator 3 corresponding to the three axial directions are changed or the dimensions in the horizontal and vertical directions are changed, it may change the frequencies of the fundamental mode and the plurality of the high-order modes and the corresponding multi-mode number and Q value, while the X, Y, and Z-axis dimensions of the inner wall of the cavity 1 are changed, the X, Y, and Z-axis dimensions of the dielectric resonator 3 corresponding to the inner wall of the cavity 1 may also be changed accordingly while a desired frequency is kept unchanged, and the ratio of the dimension of the inner wall of the cavity 1 to the dimension of the dielectric resonator 3 corresponding to the three axial directions thereof or the ratio of the dimensions in the horizontal and vertical directions is between 1.01-4.5.

Herein the one single axial dielectric resonant structure or the two vertically intersected single axial dielectric resonant structures or the three mutually vertically intersected single axial dielectric resonant structures may be through-slotted or blind-slotted along any axis, plane, slope and diagonal, and may be cut into different numbers of small dielectric resonator blocks, and the small dielectric resonator blocks may be fixed to form a dielectric resonator 3 through a dielectric or metal connecting block, or it may be blind-cut so that the dielectric resonator 3 is integrally connected between the adjacent small dielectric resonator blocks, a slot width of a through slot and a blind slot is larger, the influence thereof on the frequency, the Q value and the mode number is greater, and the slot width is smaller, the influence thereof on the frequency, the Q value and the mode number is smaller, while the connecting block is made of metal, the Q value of the formed split dielectric resonator 3 may be greatly reduced, while the ratio of the dimension of the inner wall of the cavity 1 to the dimension of the dielectric resonator 3 corresponding to the three axial directions thereof or the ratio of the dimensions in the horizontal and vertical directions is between 1.01-4.5, the mode number corresponding to the frequencies of the fundamental mode and the high-order mode is 1-N, the multi-mode Q value corresponding to the different frequencies of the fundamental mode and high-order mode may be changed, and the dielectric resonator 3 with different dielectric constants may affect the change of the frequency, the Q value, and the mode number thereof, while the dimension ratio between the cavity and one axial dielectric resonator 3 or the other one or two axial dielectric resonators 3 or three axial dielectric resonators 3 is changed, the corresponding fundamental mode and multi-mode number, the frequency, and the Q value may also be changed accordingly.

Herein in the one single axial dielectric resonant structure or the two vertically intersected single axial dielectric resonant structures or the three mutually vertically intersected single axial dielectric resonant structures, while the ratio of the dimension of the inner wall of the cavity 1 to the dimension of the dielectric resonator 3 corresponding to the three axial directions thereof or the ratio of the dimensions in the horizontal and vertical directions is between 1.01-4.5, the dimensions of the multi-mode and the Q valve corresponding to the frequencies of the fundamental mode and a plurality of the high-order modes may be changed, and the Q values of the dielectric resonators 3 with the different dielectric constants are different, herein the change relationship of the dimension change of the Q value with the ratio 1.01-4.5 of the dimension of the inner wall of the cavity 1 to the dimension of the dielectric resonator 3 corresponding to the three axial directions thereof or the ratio 1.01-4.5 of the dimensions in the horizontal and vertical directions is that the Q value is directly proportional to the dimension change of the dimension ratio or the Q value has a larger change near certain specific ratios, and the changes of the multi-mode Q values corresponding to the different frequencies are different near certain specific ratios, while the dimension ratio between the cavity and one axial dielectric resonator 3 or the other one or two axial dielectric resonators 3 or three axial dielectric resonators 3 is changed, the corresponding fundamental mode Q value may also be changed accordingly.

Herein in the one single axial dielectric resonant structure or the two vertically intersected single axial dielectric resonant structures or the three mutually vertically intersected single axial dielectric resonant structures, while the ratio of the dimension of the inner wall of the cavity 1 to the dimension of the dielectric resonator 3 corresponding to the three axial directions thereof or the ratio of the dimensions in the horizontal and vertical directions is between 1.01-4.5, while the fundamental mode frequency thereof is kept unchanged, the high-order mode frequency and the fundamental mode frequency, and an interval between the frequencies of the plurality of the high-order modes may be changed for many times, and the changes of the interval of the frequencies of the dielectric resonators 3 with the different dielectric constants are different, while the dimension ratio between the cavity and one axial dielectric resonator 3 or the other one or two axial dielectric resonators 3 or three axial dielectric resonators 3 is changed, the corresponding fundamental mode and multi-mode frequency intervals may also be changed accordingly.

Herein in the one single axial dielectric resonant structure or the two vertically intersected single axial dielectric resonant structures or the three mutually vertically intersected single axial dielectric resonant structures, while the ratio of the dimension of the inner wall of the cavity 1 to the dimension of the dielectric resonator 3 corresponding to the three axial directions thereof or the ratio of the dimensions in the horizontal and vertical directions is between 1.01-4.5, while the cavity 1 dimension and the fundamental mode frequency are kept unchanged, and the horizontal and vertical dimensions of the three axial dimensions of the single axial dielectric resonator 3 are changed in any combinations, the fundamental mode of the single axial dielectric resonant structure may form the 1-3 multi-modes with the same frequency or close frequencies, and the plurality of the high-order modes with the different frequencies forms 1-N multi-modes at the same frequency; the fundamental mode of the vertically intersected biaxial dielectric resonant structure and the triaxial intersected dielectric resonant structure may form 1-6 multi-modes with the same frequency or close frequencies, and the plurality of the high-order modes with the different frequencies forms 1-N multi-modes at the same frequency, while the cavity dimension ratio corresponding to the dimension of one axial dielectric resonator 3 and the other one or two axial dielectric resonators 3 or three axial dielectric resonators 3 is changed, the corresponding fundamental mode and multi-mode number may also be changed accordingly.

Herein an edge or a sharp corner of the dielectric resonator 3 or/and the cavity 1 is provided with a cut side to form adjacent coupling, and the cavity 1 and the dielectric resonator 3 is cut into a triangle or a quadrilateral, or partial or whole edge cutting is performed at the edge of the cavity 1 or the dielectric resonator 3, the cavity 1 and the dielectric resonator 3 are side-cut at the same time or side-cut separately, and after the adjacent coupling is formed by the side-cutting, the frequency and the Q value may be changed accordingly, and the adjacent coupling may also affect cross coupling thereof.

Herein a sharp corner position at the intersection of three surfaces of the cavity 1 corresponding to the one single axial dielectric resonator 3 or the two vertically intersected single axial dielectric resonators 3 or the three mutually vertically intersected single axial dielectric resonators 3 is corner-cut and/or the cavity 1 is corner-cut and closed to form cross coupling, and the corresponding frequency and Q value may also be changed accordingly, and it may also affect the adjacent coupling.

In other words, the edge or the sharp corner of the dielectric resonator or/and the cavity 1 is provided with the cut side to form the adjacent coupling, the cavity 1 needs to be sealed after being side-cut, and the cavity 1 and the dielectric resonator may be cut into the triangle or the quadrilateral, the partial or whole edge cutting may be performed at the edge of the cavity 1 or the dielectric resonator, the cavity 1 and the dielectric resonator may be side-cut at the same time or side-cut separately, but it may not be interfered in structure. After being side-cut, the frequency and the Q value may be changed accordingly.

In the single axial high-Q multi-mode dielectric resonant structure, the vertically intersected biaxial high-Q multi-mode dielectric resonant structure, or the triaxial intersected high-Q multi-mode dielectric resonant structure, the number and position of the couplings between the adjacent fundamental modes are determined by the axially adjacent edges and diagonal edges or parallel edges of the dielectric resonator through corner-cutting, and the adjacent coupling may also be achieved by corner-cutting the medium and the cavity 1 at the same time. The strength of a coupling coefficient is determined by a single-edge or a double-edge, and an adjacent coupling adjustment device may be mounted on the cavity 1 corresponding to the cut corner of the edge. Under the premise that the dimension is completely guaranteed, it is also not necessary to mount the coupling adjustment device, and while the coupling between the fundamental modes is separately adjusted, the coupling between the adjacent high-order modes is less affected; and while the coupling between the adjacent high-order modes is adjusted separately, the coupling between the fundamental modes is less affected. The dimension of the coupling amount between the adjacent fundamental mode couplings may be determined by side-cutting the edge of the dielectric resonator or the edge of cavity 1, and whole side-cutting or partial side-cutting may be performed on the edge, or the side-cutting may be performed on the dielectric resonator or two adjacent surfaces of the cavity 1 at an angle of 45 degrees or the side-cutting may be performed at different angles, and an adjusting device is mounted at the cut side to adjust a vertical coupling.

While the single axial high-Q multi-mode dielectric resonant structure, the vertically intersected biaxial high-Q multi-mode dielectric resonant structure, or the triaxial intersected high-Q multi-mode dielectric resonant structure performs the adjacent coupling, the axial magnetic field directions are parallelly intersected to adjust the dimension and shape of a window between the adjacent couplings, it may change the coupling strength thereof.

The corner-cutting of the single-edge may also affect a zero point of the cross coupling, it may reduce the strength of the single-edge coupling, increase the adjacent coupling of the diagonal edge, and reduce the influence of the zero-point.

The high-Q multi-mode dielectric resonant structure may form the adjacent coupling, the cross coupling and the input-output coupling of the fundamental mode and the adjacent high-order mode. The adjacent coupling is side-cut through the edges of the dielectric resonator and the cavity 1 in the high-Q multi-mode dielectric resonant structure, the dimension of the cut side and the position and area of the dielectric support frame 2 may affect the strength of the adjacent coupling, and the cross coupling is side-cut through the sharp corners or the edges of the dielectric resonator and the cavity 1 in the high-Q multi-mode dielectric resonant structure, the dimension of the cut side and the position and area of the dielectric support frame 2 may affect the strength of the cross coupling; the input-output coupling is connected to the inner wall of the cavity 1 through a coupling line or a coupling sheet in the high-Q multi-mode dielectric resonant structure, a coupling signal in the high-Q multi-mode dielectric resonant structure is introduced into an input-output connector for connection, and the coupling strength may be adjusted by changing the dimension of the coupling line or the coupling sheet. While the coupling between the fundamental modes is adjusted separately, the coupling between the adjacent high-order modes is less affected; and while the coupling between the adjacent high-order modes is adjusted separately, the coupling between the fundamental modes is less affected.

In the single axial high-Q multi-mode dielectric resonant structure, the vertically intersected biaxial high-Q multi-mode dielectric resonant structure, or the triaxial intersected high-Q multi-mode dielectric resonant structure, the number of the cross couplings is related to the number of the couplings between the adjacent fundamental modes, while the fundamental mode is three degenerate-state multi-modes, a capacitive or inductive cross coupling may be formed by corner-cutting the sharp corner at the intersection of three surfaces of the dielectric resonator, and a single corner-cutting angle may be used in the dielectric resonator as required or the cross coupling may also be formed by corner-cutting two diagonal corners, or the corner-cutting is performed in the sharp corner position at three surfaces of the cavity 1 or the corner-cutting is performed on the dielectric resonator and the cavity 1 at the same time to set the cross coupling.

While the single axial high-Q multi-mode dielectric resonant structure, the vertically intersected biaxial high-Q multi-mode dielectric resonant structure, or the triaxial intersected high-Q multi-mode dielectric resonant structure is combined with the cavity 1 single mode, a parasitic coupling zero point may also be formed by the coupling of the adjacent cavities 1, and by adjusting the dimension of the window between the adjacent couplings, the position of the zero point is also changed.

While the single axial high-Q multi-mode dielectric resonant structure, the vertically intersected biaxial high-Q multi-mode dielectric resonant structure, or the triaxial intersected high-Q multi-mode dielectric resonant structure is combined with its adjacent single, vertically intersected biaxial and triaxial intersected resonant structures, a plurality of capacitive or inductive cross coupling zero points may be formed at most, and it is related to L+N mode resonance formed by the fundamental mode and the adjacent high-order mode.

Herein, at least one tuning device is arranged in a position in which the field strength of the dielectric resonator 3 is concentrated. The tuning device is mounted on any surfaces of the cavity 1. On the basis of the above embodiments, as another preferred embodiment, the resonant frequency of the high-Q multi-mode dielectric resonant structure may be tuned at a place where the field strength of one mode is concentrated, and in the single axial high-Q multi-mode dielectric resonant structure, the vertically intersected biaxial high-Q multi-mode dielectric resonant structure and the triaxial vertical high-Q multi-mode dielectric resonant structure, a frequency tuning device may be added at or near a position where the field strength is concentrated, and while the L+N mode is at the same frequency or at the different frequencies, there are L fundamental mode frequency tuning devices or L+N mode tuning devices, and the same axial surface may have a plurality of the tuning devices for tuning. While the resonant frequency of the fundamental mode is tuned separately, the frequency of the adjacent high-order mode is less affected; and while the resonance frequency of the adjacent high-order mode is tuned separately, the frequency of the fundamental mode is also less affected.

In the special vertically intersected biaxial structure, the fundamental mode is a three-mode, and the high-order mode is the electromagnetic field of the three-mode situation. Any screws with each surface added separately may only affect the fundamental mode frequency separately, but may not affect the high-order mode frequency.

Herein, the shape of the cavity 1 corresponding to the one single axial dielectric resonant structure or the two vertically intersected single axial dielectric resonant structures or the three mutually vertically intersected single axial dielectric resonant structures includes at least one of following: a cuboid, a cube, and a polygon, and the inner wall surface of the cavity 1 or a part of an inner region may be provided with a concave or a convex or a cut corner or a slot.

Herein the cavity 1 material is metal or non-metal, and the surfaces of the metal and non-metal are electro-plated with copper or electro-plated with silver.

Herein the cross-sectional shape of the one single axial dielectric resonator 3 or the two vertically intersected single axial dielectric resonators 3 or the three mutually vertically intersected single axial dielectric resonators 3 includes at least one of following: a cylinder, an ellipsoid, and a polygon. The shape of the dielectric resonator in the high-Q multi-mode dielectric resonant structure includes at least one of following: to the cylinder, the ellipsoid, and the polygon. The dielectric resonator is arranged in the position close to and coincided with the center of the cavity 1, and fixedly connected with the dielectric support frame 2.

While the shape of the dielectric resonator in the single axial high-Q multi-mode dielectric resonant structure, the vertically intersected biaxial high-Q multi-mode dielectric resonant structure and the triaxial intersected high-Q multi-mode dielectric resonant structure is the cylinder, the ratio of the inner wall dimension of the cavity 1 to the diameter dimension of a certain section of the cylindrical dielectric resonator is K, and the ratio of the inner wall dimension of the cavity 1 to the dimension of one axial direction perpendicular to a certain section in the dielectric resonator is M; while the shape of the dielectric resonator is the ellipsoid, the ratio of the inner wall dimension of the cavity 1 to the equivalent diameter dimension of the ellipsoid dielectric resonator is K; and while the shape of the dielectric resonator is the polygon, the ratio of the inner wall dimension of the cavity to the dimension between the farthest angles of two equivalent straight lines corresponding to the polygon is K, and while the specific shape of the polygon is the cube, the ratio of the inner wall dimension of the cavity 1 to the side length dimension of a multi-cube is K, and the ratio of the inner wall dimension of the cavity 1 to the axial dimension perpendicular to a certain section of the dielectric resonator is M.

While the dielectric resonator in the high-Q multi-mode single axial resonant structure is the cylinder or the ellipsoid, the cavity 1 and the dielectric resonator are under different combinations of the K value and the M value, the fundamental mode and the adjacent high-order mode form L+N mode resonances with the different frequencies; while the fundamental mode frequency is close to the adjacent high-order mode frequency, L mode resonances with the same frequency are formed; while the dielectric resonator in the high-Q multi-mode single axial resonance structure is the polygon, and the number of the sides is less, the fundamental mode and the adjacent high-order mode may form L degenerate-state modes and N adjacent high-order modes; and while the number of the sides of the polygon is more, a change rule of the resonant mode of the fundamental mode and the adjacent high-order mode thereof is similar to that of the cylinder and the ellipsoid.

While the dielectric resonator in the high-Q multi-mode vertically intersected biaxial resonator structure is the cylinder or the ellipsoid, the cavity 1 and the vertically intersected biaxial resonators are under the different combinations of the K value and the M value, the fundamental mode and the adjacent high-order mode form L+N mode resonances with the different frequencies, and the frequencies of the fundamental mode and the adjacent high-order modes are overlapped under a certain combination of the K value and the M value, and form L mode resonances with the same frequency; while the vertically intersected biaxial resonator is the polygon, the cavity 1 and the vertically intersected biaxial resonator are under the different combinations of the K value and the M value, the fundamental mode and the adjacent high-order mode are L+N mode resonances; and while the dielectric resonator in the high-Q multi-mode vertically intersected biaxial resonant structure is the polygon, and the number of the sides is more, and while the dielectric resonator in the high-Q multi-mode dielectric resonant structure is close to the cylinder, the change rule of the mode number of the fundamental mode with the same frequency and the different frequencies and the adjacent high-order mode is similar to that of the cylinder or the ellipsoid. While the number of the sides of the dielectric resonator in the high-Q multi-mode dielectric resonant structure is less, the dielectric resonator is close to the cube, and the fundamental mode and the adjacent high-order mode may form L degenerate-state modes with the different frequencies and N adjacent high-order modes or L fundamental modes with the same frequency.

While the dielectric resonator in the high-Q multi-mode triaxial intersected resonant structure is the cylinder or the ellipsoid, under the different combinations of the K value and the M value, the fundamental mode and the adjacent high-order mode form L+N mode resonances with the different frequencies, the frequencies of the fundamental mode and the adjacent high-order mode are overlapped under a certain combination of the K value and the M value, and L mode resonances with the same frequency are formed, and the adjacent high-order modes are N mode resonances with the different frequencies; and while the dielectric resonator in the high-Q multi-mode triaxial intersected resonant structure is the polygon, and the number of the sides is more, while the dielectric resonator in the high-Q multi-mode dielectric resonant structure is close to the cylinder or an ellipse full body, the change rule of the mode number of the fundamental mode with the same frequency and the different frequencies and the adjacent high-order mode is similar to that of the cylinder or the ellipsoid. While the number of the sides of the dielectric resonator in the high-Q multi-mode dielectric resonant structure is less, the dielectric resonator is close to the cube, and the fundamental mode and the adjacent high-order mode may form L degenerate-state modes with the different frequencies and N adjacent high-order modes or L fundamental modes with the same frequency.

While the volume of the cavity 1 remains unchanged, and while any one or two dimensions of the dielectric resonator in the same axial direction of the high-Q multi-mode dielectric resonant structure are increased, the frequency is decreased accordingly; while the dimension in the same axial direction is decreased, the frequency is increased accordingly; the fixed area of the dielectric support frame 2 in the dielectric resonator is larger, the frequency is reduced more, and the contact area is smaller, the frequency is reduced less, while the dielectric support frame 2 is mounted on the cross section of the dielectric resonator and the inner wall of the cavity 1, the effect of frequency drop is the greatest, and while the dielectric support frame 2 is mounted on the edge of any two adjacent surfaces of the dielectric resonator, the frequency effect is moderate; and while the dielectric support frame 2 is mounted in a position in which the sharp corner formed by the adjacent surfaces of the inner wall of the cavity 1 is fixedly connected with the sharp corner formed by the adjacent surfaces of the corresponding dielectric resonator, the effect on the frequency is the smallest.

While the frequency interval of the fundamental mode is relatively close to that of the adjacent high-order mode, and while the fundamental mode frequency is kept unchanged, the frequency intervals of the fundamental mode and the adjacent high-order mode may be adjusted by changing combinations of position, dimension, shape, dielectric constant and number of the dielectric support frame 2, but it may affect a certain Q value and coupling.

Herein the surface or the inner region of the dielectric resonator 3 may be partially provided with a concave or a convex or a cut corner or a slot or an edge.

Herein the one single axial dielectric resonator 3 or the two vertically intersected single axial dielectric resonators 3 or the three mutually vertically intersected single axial dielectric resonators 3 are solid or hollow.

Herein the dielectric resonator 3 material is a ceramic, a composite dielectric material, or a dielectric material with a dielectric constant greater than 1.

Herein the dielectric support frame 2 is located at the end face, the edge, and the sharp corner of the dielectric resonator 3 or the sharp corner of the cavity, and is placed between the dielectric resonator 3 and the cavity, the dielectric resonator 3 is supported in the cavity by the dielectric support frame 2, while the dielectric support frame 2 is mounted in different positions of the dielectric resonator 3, the corresponding fundamental mode and multi-mode number, the frequency and the Q value thereof may also be changed accordingly, the connecting block may connect any two or more adjacent small dielectric resonator blocks, the connecting block is located at any positions of the small dielectric resonator block, and the different numbers of the small dielectric resonator blocks may be fixed to form the dielectric resonator 3, and while the connecting block is located at the different positions of the dielectric resonator 3, the corresponding fundamental mode and multi-mode number, the frequency, and the Q value may also be changed accordingly, while the ratio of the dimension of the inner wall of the cavity 1 to the dimension of the dielectric resonator 3 corresponding to the three axial directions thereof or the ratio of the dimensions in the horizontal and vertical directions is between 1.01-4.5, the Q values of the fundamental mode and the high-order mode are changed for many times, while the dimension ratio between the cavity and one axial dielectric resonator 3 or the other one or two axial dielectric resonators 3 or the three axial dielectric resonators 3 is changed, the frequencies of the corresponding fundamental mode and the plurality of the high-order modes and the corresponding multi-mode number and Q value may also be changed accordingly.

Herein the dielectric support frame 2 and the dielectric resonator 3 or the cavity 1 are combined to form an integrated structure or a split structure.

Herein the dielectric support frame 2 of the one single axial dielectric resonator 3 or the two vertically intersected single axial dielectric resonators 3 or the three mutually vertically intersected single axial dielectric resonators 3 is made of the dielectric material, the material of the dielectric support frame 2 is an air, plastic or ceramic, composite dielectric material, and the connecting block may be a dielectric or metal material.

Herein the dielectric support frame 2 is connected with the dielectric resonator 3 and the cavity 1 by means of press-connecting, bonding, splicing, welding, snap-fitting or screw-fastening, and the dielectric support frame 2 is connected to one or more end faces of the one single axial dielectric resonator 3 or the two vertically intersected single axial dielectric resonators 3 or the three mutually vertically intersected single axial dielectric resonators 3, the dielectric or metal connecting block is used to fix the cut small dielectric resonator block by means of the press-connecting, bonding, splicing, welding, snap-fitting or screw-fastening, a plurality of the small dielectric resonator blocks with arbitrary shapes is connected to form the dielectric resonator 3 by the connecting block.

Herein, the dielectric support frame 2 is mounted at any positions corresponding to the dielectric resonator 3 and the inner wall of the cavity 1 and matched with any shapes of the dielectric resonator 3 and the cavity 1 and is fixed by connecting, the dielectric support frame 2 includes a solid with two parallel surfaces or a structure of which the middle is penetrated, and the number of the dielectric support frames 2 at the same end face or different end faces, edges and sharp corners of the dielectric resonator 3 is one or more different combinations, and the corresponding frequencies, mode number and Q value of the different numbers of the dielectric support frame 2 may also be different, while the ratio of the dimension of the inner wall of the cavity 1 to the dimension of the dielectric resonator 3 corresponding to the three axial directions thereof or the ratio of the dimensions in the horizontal and vertical directions is between 1.01-4.5, the Q values of the fundamental mode and the high-order mode may be changed for many times, the connecting block is any shapes and is matched and mounted between two or more adjacent small dielectric resonator blocks, so that the plurality of the small dielectric resonator blocks is connected and fixed to form a split dielectric resonator 3, and the connecting block includes a solid or a structure of which the middle is penetrated, and the number of the connecting blocks at the same end face or different end faces, edges and sharp corners of the dielectric resonator is one or more different combinations, and the corresponding frequencies, mode number and Q value of the different numbers of the connecting blocks may also be different, while the ratio of the dimension of the inner wall of the cavity 1 to the dimension of the dielectric resonator 3 corresponding to the three axial directions thereof or the ratio of the dimensions in the horizontal and vertical directions is between 1.01-4.5, the Q values of the fundamental mode and the high-order mode may be changed for many times, while the cavity dimension ratio corresponding to the dimension of the one single axial dielectric resonator 3 and the other one or two axial dielectric resonators 3 or the three axial dielectric resonators 3 is changed, the frequencies of the corresponding fundamental mode and the plurality of the high-order modes and the corresponding multi-mode number and Q value may be changed accordingly.

Herein an elastic spring sheet or an elastic dielectric material for stress relief is arranged between the dielectric support frame 2 of the one single axial dielectric resonator 3 or two vertically intersected single axial dielectric resonators 3 or the three mutually vertically intersected single axial dielectric resonators 3 and the inner wall of the cavity 1.

Herein the dielectric support frame 2 of the dielectric resonator 3 is in contact with the inner wall of the cavity 1 to form heat conduction.

The present invention further discloses a dielectric filter of the high-Q multi-mode dielectric resonant structure, herein a single axial dielectric high-Q multi-mode dielectric resonant structure, a vertically intersected biaxial high-Q multi-mode dielectric resonant structure or a vertically intersected triaxial high-Q multi-mode dielectric resonant structure may form 1-N single pass band filters with different frequencies, and the single pass band filters with the different frequencies form a multi-pass band filter, a duplexer or an arbitrary combination of the duplexers, the corresponding high-Q multi-mode dielectric resonant structure may also be arbitrarily combined in different forms with a single-mode resonant cavity 1, a double-mode resonant cavity 1 and a three-mode resonant cavity 1 of metal or dielectric, as to form the different dimensions of a plurality of the single pass band or multi-pass band filters or the duplexers or arbitrary combines of the duplexers required.

Herein the cavity 1 corresponding to the single axial dielectric high-Q multi-mode dielectric resonant structure, the vertically intersected biaxial high-Q multi-mode dielectric resonant structure or the vertically intersected triaxial high-Q multi-mode dielectric resonant structure may perform arbitrary combines of adjacent coupling or cross coupling with the metal resonator single mode or multi-mode cavity 1, and the dielectric resonator 3 single mode or multi-mode cavity 1.

It is described in detail below with reference to FIGS. 1 to 8 and experimental data.

Figure 2:
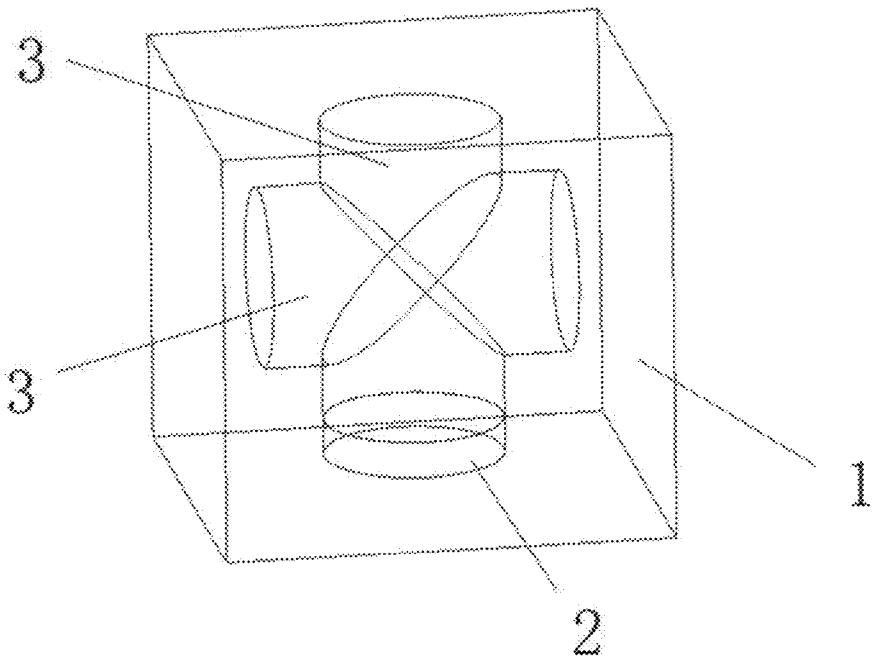
FIG. 2 is a structure schematic diagram of two single axial resonant structures of the present invention that are a mutually vertically intersected biaxial resonant structure.
Figure 3:
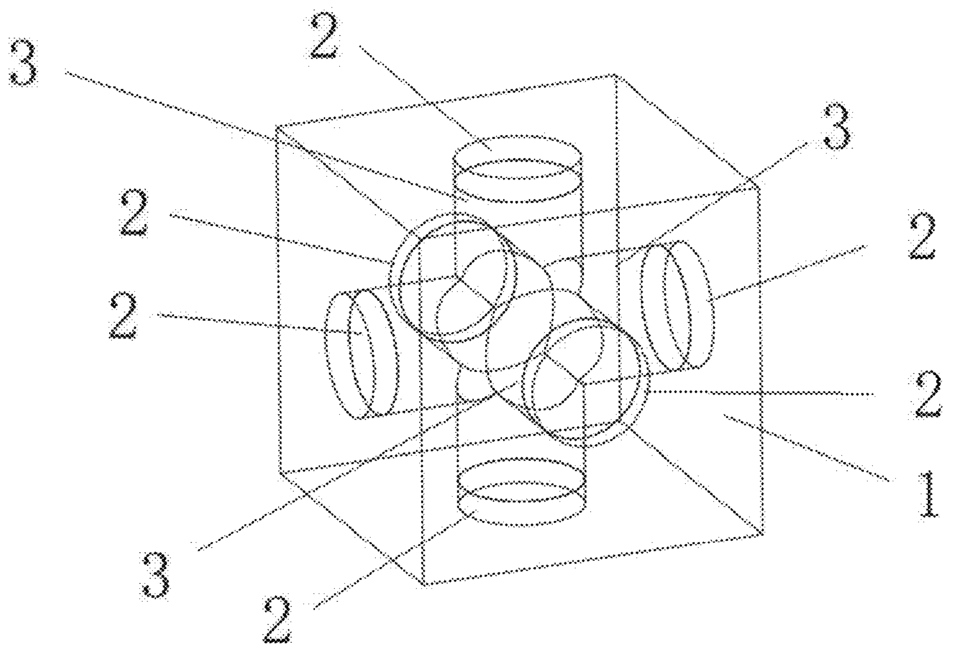
FIG. 3 is a structure schematic diagram of three single axial resonant structures of the present invention that are a mutually vertically intersected triaxial resonant structure.
Figure 4:
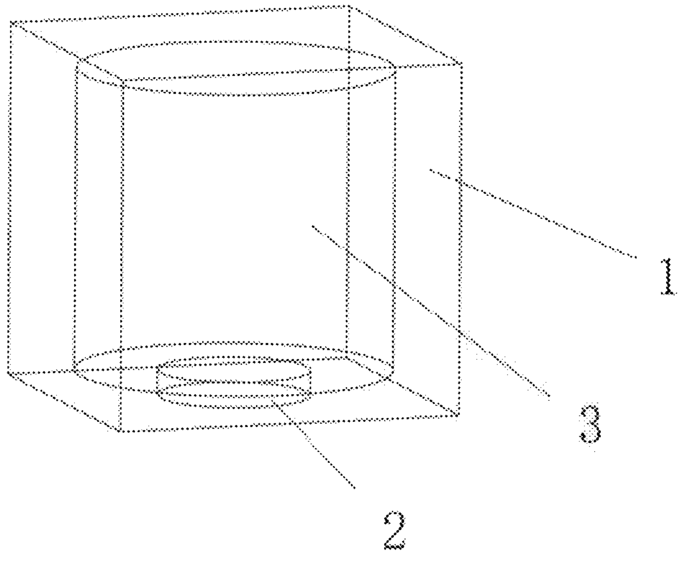
FIG. 4 is a structure schematic diagram of a dielectric support frame arranged on an end face of a dielectric resonator according to the present invention.
Figure 5:
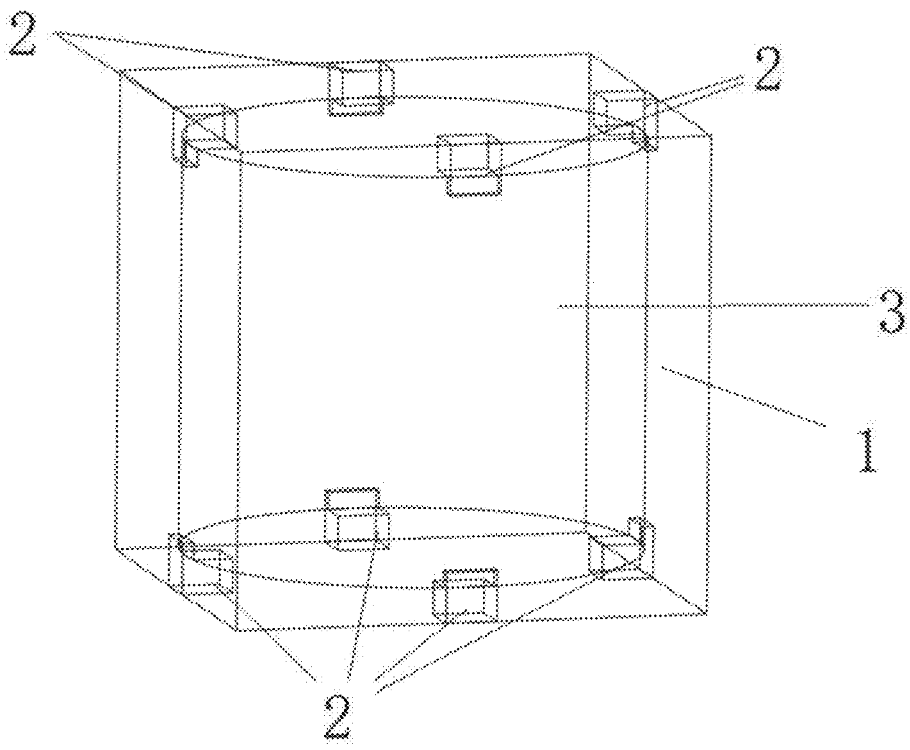
FIG. 5 is a structure schematic diagram of the dielectric support frame arranged on an edge of a cavity according to the present invention.
Figure 6:
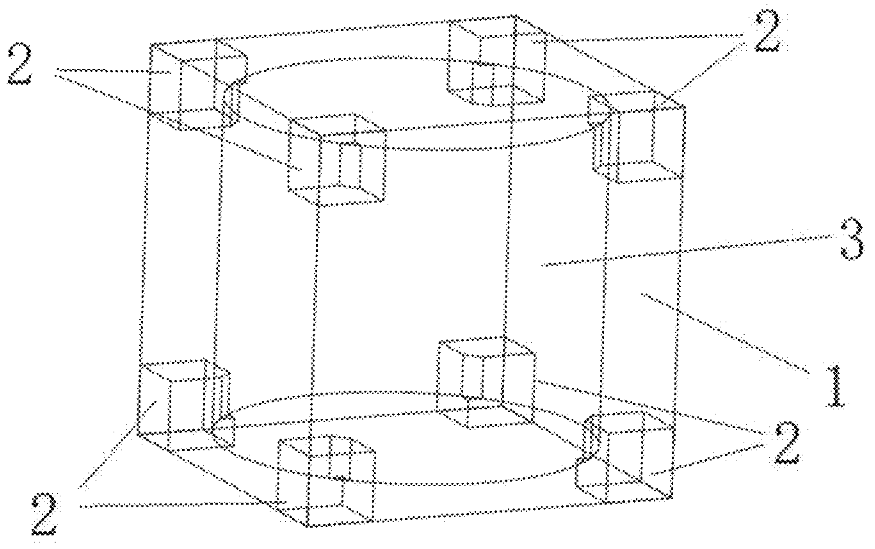
FIG. 6 is a structure schematic diagram of the dielectric support frame arranged on a sharp corner of the cavity according to the present invention.
Figure 7:
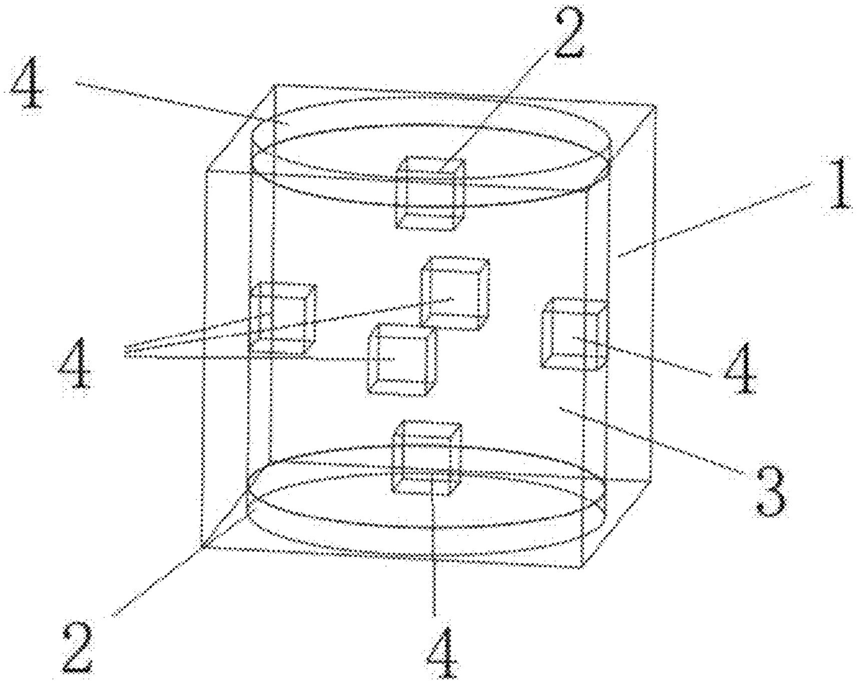
FIG. 7 is a structure schematic diagram of an end face slot of the dielectric resonator of the present invention.

As shown in FIGS. 1 to 3, it is a high-Q multi-mode dielectric resonant structure provided according to an embodiment of the present invention, including a cavity 1, a dielectric support frame 2, a dielectric resonator and a cover plate; the cavity 1 is formed by a sealed space, herein one surface of the cavity 1 is a cover plate surface; the dielectric resonator is formed by a medium; the dielectric resonator is mounted in the cavity without contacting an inner wall of the cavity; the dielectric support frame 2 is mounted in any positions between the dielectric resonator and the inner wall of the cavity, matched with any shapes of the dielectric resonator and the cavity and fixed by connecting.

The cavity 1 is internally provided with a cylindrical or polygonal dielectric resonator 3 and a fixed dielectric support frame 2 thereof to form a multi-mode dielectric resonant structure with the cavity, as shown in FIG. 1. The dielectric multi-mode resonant structure may achieve a single-mode, a double-mode and a three-mode of the fundamental mode within a certain dimension value range, namely the dielectric resonator 3 is trimmed, slotted and chamfered in the horizontal and vertical directions, so that the dimension of the inner wall of the cavity 1 thereof and the dimension of the dielectric resonator 3 corresponding to three axial directions are changed or the dimensions in the horizontal and vertical directions are changed, as to change the frequencies of the fundamental mode and a plurality of the high-order modes and the corresponding multi-mode number and Q value, as shown in Example 1/2/3.

Example 1: the cavity 1 is a cube with a side length of 30 mm, the dielectric resonator 3 is a single axial cylinder with a dielectric constant of 43, Q*F of 43000, a diameter of 27.1 mm, and a height of 26 mm, and the dielectric support frame 2 is a ring body with a dielectric constant of 9.8, Q*F of 100000, an outer diameter of 27.1 mm, an inner diameter of 26.5 mm, and a height of 2 mm. The dielectric resonator 3 is directly supported by two dielectric support frames, and arranged in the cavity 1. It is calculated from an eigenmode that this dimension combination may achieve that the fundamental mode of the single axial dielectric resonator is a single-mode feature, and simulation results are as follows:

| Eigenmode | Frequency (MHz) | Q |
|---|---|---|
| Mode1 | 1881.4 | 12548.9 |
| Mode2 | 1887.2 | 8307.2 |
| Mode3 | 1897.1 | 8357.4 |

Herein, Mode 1 is the fundamental mode, and Mode 2 and Mode 3 are the high-order modes.

Example 2: The corresponding structural dimensions are changed in the structure of Example 1 as follows: the cavity 1 is a cube with a side length of 32 mm, the dielectric resonator 3 is a single axial cylinder with a dielectric constant of 43, Q*F of 43000, a diameter of 24.4 mm, and a height of 28 mm, and the dielectric support frame 2 is a ring body with a dielectric constant of 9.8, Q*F of 100000, an outer diameter of 24.4 mm, an inner diameter of 23.8 mm, and a height of 2 mm. The dielectric resonator 3 is directly supported by two dielectric support frames, and arranged in the cavity 1. It is calculated from an eigenmode that this dimension combination may achieve that the fundamental mode of the single axial dielectric resonator is a double-mode feature, and simulation results are as follows:

| Eigenmode | Frequency (MHz) | Q |
|---|---|---|
| Mode1 | 1883.4 | 10462.1 |
| Mode2 | 1883.1 | 10461.9 |
| Mode3 | 1905.3 | 10904.8 |

Herein, Mode 1 and Mode 2 are the fundamental modes, and Mode 3 is the high-order mode.

Example 3: the corresponding structural dimensions are changed in the structure of Example 1 and Example 2 as follows: the cavity 1 is a cube with a side length of 35 mm, the dielectric resonator 3 is a single axial cylinder with a dielectric constant of 43, Q*F of 43000, a diameter of 24 mm, and a height of 24 mm, and the dielectric support frame 2 is a ring body with a dielectric constant of 9.8, Q*F of 100000, an outer diameter of 24 mm, an inner diameter of 23.4 mm, and a height of 5.5 mm. The dielectric resonator 3 is directly supported by one dielectric support frame, and arranged in the cavity 1. It is calculated from an eigenmode that this dimension combination may achieve that the fundamental mode of the single axial dielectric resonator is a three-mode feature, and simulation results are as follows:

| Eigenmode | Frequency (MHz) | Q |
|---|---|---|
| Mode1 | 1882.4 | 13966.1 |
| Mode2 | 1884.1 | 13906.8 |
| Mode3 | 1884.2 | 13905.9 |
| Mode4 | 2240.1 | 22612.1 |

Herein, Mode 1, Mode 2 and Mode 3 are the fundamental modes, and Mode 4 is the high-order mode.

The cavity 1 is internally provided with two vertically intersected cylindrical or polygonal dielectric resonators 3 and the fixed dielectric support frame 2 thereof to form a multi-mode dielectric resonant structure with the cavity 1, herein the X-axis dimension of the X-axis cylindrical or polygonal dielectric resonator 3 is greater than the perpendicular dimension, parallel to the X-axis, of the Y-axis cylindrical or polygonal dielectric resonator 3; and herein the Y-axis dimension of the Y-axis cylindrical or polygonal dielectric resonator 3 is greater than the perpendicular dimension, parallel to the Y-axis, of the X-axis cylindrical or polygonal dielectric resonator 3, as shown in FIG. 2. The dielectric multi-mode resonant structure may achieve a single-mode, a double-mode and a three-mode of the fundamental mode, namely the dielectric resonator 3 is trimmed, slotted and chamfered in the horizontal and vertical directions, so that the dimension of the inner wall of the cavity 1 thereof and the dimension of the dielectric resonator 3 corresponding to three axial directions are changed or the dimensions in the horizontal and vertical directions are changed, as to change the frequencies of the fundamental mode and a plurality of the high-order modes and the corresponding multi-mode number and Q value, as shown in Example 4/5/6.

Example 4: the cavity 1 is a cube with a side length of 35 mm, the dielectric resonator 3 is a vertically intersected single axial dielectric resonator with a dielectric constant of 43, Q*F of 43000, a diameter of 17.5 mm, and a height of 31 mm, and the dielectric support frame 2 is a ring body with a dielectric constant of 9.8, Q*F of 100000, an outer diameter of 17.5 mm, an inner diameter of 17.1 mm, and a height of 2 mm. The dielectric resonator 3 is supported by one dielectric support frame, and arranged in the cavity 1. It is calculated from an eigenmode that this dimension combination may achieve that the fundamental mode of the vertically intersected single axial dielectric resonator is a single-mode feature, and simulation results are as follows:

| Eigenmode | Frequency (MHz) | Q |
|---|---|---|
| Mode1 | 1878.5 | 12506.6 |
| Mode2 | 1973.3 | 14570.8 |
| Mode3 | 2005.7 | 15571.4 |

Herein, Mode 1 is the fundamental mode, and Mode 2 and Mode 3 are the high-order modes.

Example 5: the corresponding structural dimensions are changed in the structure of Example 4 as follows: the cavity 1 is a cube with a side length of 45 mm, the dielectric resonator 3 is a vertically intersected single axial dielectric resonator with a dielectric constant of 43, Q*F of 43000, a diameter of 13.7 mm, a height of 41 mm, and the dielectric support frame 2 is a ring body with a dielectric constant of 9.8, Q*F of 100000, an outer diameter of 13.7 mm, an inner diameter of 13.6 mm, and a height of 2 mm. The dielectric resonator 3 are supported by four dielectric support frames, and arranged in the cavity 1. It is calculated from an eigenmode that this dimension combination may achieve that the single axial fundamental mode is a double-mode feature, and simulation results are as follows:

| Eigenmode | Frequency (MHz) | Q |
|---|---|---|
| Mode1 | 1880.1 | 15085.1 |
| Mode2 | 1882.1 | 15113.1 |
| Mode3 | 2122.5 | 20111.7 |

Herein, Mode 1 and Mode 2 are the fundamental modes, and Mode 3 is the high-order mode.

Example 6: the corresponding structural dimensions are changed in the structure of Example 4 and Example 5 as follows: the cavity 1 is a cube with a side length of 35 mm, the dielectric resonator 3 is a vertically intersected single axial dielectric resonator with a dielectric constant of 43, Q*F of 43000, a diameter of 22.7 mm, and a height of 22.7 mm, and the dielectric support frame 2 is a ring body with a dielectric constant of 9.8, Q*F of 100000, an outer diameter of 11.3 mm, an inner diameter of 11.1 mm, and a height of 6.15 mm. The dielectric resonator 3 is supported by four dielectric support frames, and arranged in the cavity 1. It is calculated from an eigenmode that this dimension combination may achieve that the single axial fundamental mode is a three-mode feature, and simulation results are as follows:

| Eigenmode | Frequency (MHz) | Q |
|---|---|---|
| Mode1 | 1883.5 | 13981.2 |
| Mode2 | 1892.2 | 14135.3 |
| Mode3 | 1892.2 | 14135.6 |
| Mode4 | 2283.7 | 23107.2 |

Herein, Mode 1, Mode 2 and Mode 3 are the fundamental modes, and Mode 4 is the high-order mode.

Figure 8:
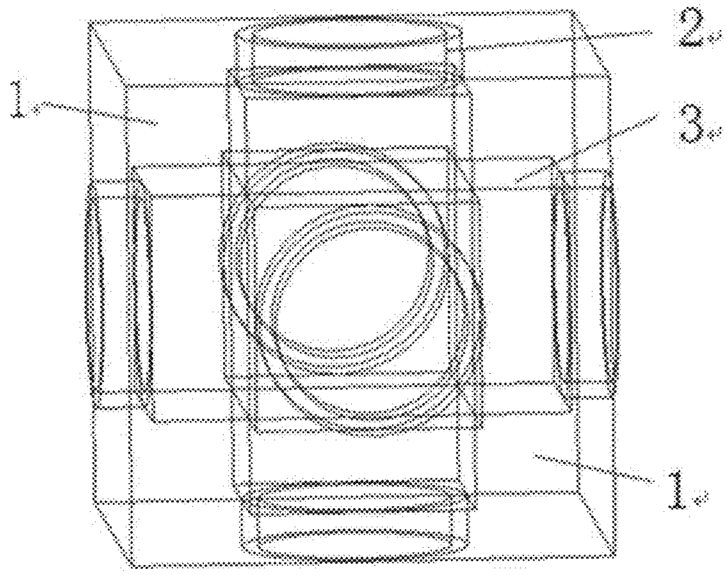
FIG. 8 is a structure schematic diagram of three single axial resonant structures of the present invention that are another mutually vertically intersected triaxial resonant structure.

The cavity 1 is internally provided with three mutually vertically intersected cylindrical or polygonal dielectric resonators 3 and the fixed dielectric support frame 2 thereof to form a multi-mode dielectric resonant structure with the cavity 1, herein the X-axis dimension of the X-axis cylindrical or polygonal dielectric resonator 3 is greater than the perpendicular dimensions, parallel to the X-axis, of the Y-axis cylindrical or polygonal dielectric resonator 3 and the Z-axis cylindrical or polygonal dielectric resonator 3; herein the Y-axis dimension of the Y-axis cylindrical or polygonal dielectric resonator 3 is greater than the perpendicular dimensions, parallel to the Y-axis, of the X-axis cylindrical or polygonal dielectric resonator 3 and the Z-axis cylindrical or polygonal dielectric resonator 3; and herein the Z-axis dimension of the Z-axis cylindrical or polygonal dielectric resonator 3 is greater than the perpendicular dimensions, parallel to the Z-axis, of the X-axis cylindrical or polygonal dielectric resonator 3 and the Y-axis dimension of the Y-axis cylindrical or polygonal dielectric resonator 3, as shown in FIG. 3 and FIG. 8. The dielectric multi-mode resonant structure may achieve a single-mode, a double-mode and a three-mode of the fundamental mode, namely the dielectric resonator 3 is trimmed, slotted and chamfered in the horizontal and vertical directions, so that the dimension of the inner wall of the cavity 1 thereof and the dimension of the dielectric resonator 3 corresponding to three axial directions are changed or the dimensions in the horizontal and vertical directions are changed, as to change the number of the fundamental mode and Q value, as shown in Example 7/8/9.

Example 7: the cavity 1 is a cube with a side length of 32 mm, the dielectric resonator 3 is three mutually vertically intersected single axial dielectric resonators with a dielectric constant of 43, Q*F of 43000, a diameter of 13.7 mm, and a height of 28 mm, and the dielectric support frame 2 is a cylinder with a dielectric constant of 9.8, Q*F of 100000, an outer diameter of 13.7 mm, and a height of 2 mm. The dielectric resonator 3 is supported by one dielectric support frame, and arranged in the cavity 1. It is calculated from an eigenmode that this dimension combination may achieve that the fundamental mode of the vertically intersected single axial dielectric resonator is a single-mode feature, and simulation results are as follows:

| Eigenmode | Frequency (MHz) | Q |
|---|---|---|
| Mode1 | 1877.7 | 8750.2 |
| Mode2 | 2204.1 | 14078.5 |
| Mode3 | 2204.1 | 14079.2 |

Herein, Mode 1 is the fundamental mode, and Mode 2 and Mode 3 are the high-order modes.

Example 8: the corresponding structural dimensions are changed in the structure of Example 7 as follows: the cavity 1 is a cube with a side length of 30 mm, the dielectric resonator 3 is three mutually vertically intersected single axial dielectric resonators with a dielectric constant of 43, Q*F of 43000, a diameter of 13.5 mm, and a height of 26 mm, and the dielectric support frame 2 is a ring body with a dielectric constant of 9.8, Q*F of 100000, an outer diameter of 13.5 mm, an inner diameter of 9.5 mm, and a height of 2 mm. The dielectric resonator 3 is supported by four dielectric support frames, and arranged in the cavity 1. It is calculated from an eigenmode that this dimension combination may achieve that the fundamental mode of the vertically intersected single axial dielectric resonator is a double-mode feature, and simulation results are as follows:

| Eigenmode | Frequency (MHz) | Q |
|---|---|---|
| Mode1 | 1884.9 | 8153.1 |
| Mode2 | 1885.1 | 8157.1 |
| Mode3 | 2271.8 | 13185.7 |

Herein, Mode 1 and Mode 2 are the fundamental modes, and Mode 3 is the high-order mode.

Example 9: the corresponding structural dimensions are changed in the structure of Example 7 and Example 8 as follows: the cavity 1 is a cube with a side length of 34 mm, the dielectric resonator 3 is three mutually vertically intersected single axial dielectric resonators with a dielectric constant of 43, Q*F of 43000, a diameter of 13.7 mm, and a height of 30 mm, and the dielectric support frame 2 is a ring body with a dielectric constant of 9.8, Q*F of 100000, an outer diameter of 13.7 mm, an inner diameter of 11.7 mm, and a height of 2 mm. The dielectric resonator 3 is supported by six dielectric support frames, and arranged in the cavity 1. It is calculated from an eigenmode that this dimension combination may achieve that the fundamental mode of the vertically intersected single axial dielectric resonator is a three-mode feature, and simulation results are as follows:

| Eigenmode | Frequency (MHz) | Q |
|---|---|---|
| Mode1 | 1882.1 | 10238.9 |
| Mode2 | 1882.4 | 10241.8 |
| Mode3 | 1882.4 | 10242.6 |
| Mode4 | 2167.5 | 15123.8 |

Herein, Mode 1, Mode 2 and Mode 3 are the fundamental modes, and Mode 4 is the high-order mode.

It may be seen from the above experimental data that while the dielectric resonant structure is the one single axial resonator (namely the cylindrical or polygonal dielectric resonator 3), the two vertically intersected single axial resonators or the three mutually vertically intersected single axial resonators, and while the dielectric resonator is trimmed, slotted and chamfered in the horizontal and vertical directions, the change of the ratio of the inner wall dimension of the cavity thereof to the diameter dimension of the axial vertical dielectric resonator may change the frequencies of the corresponding fundamental mode and high-order mode thereof and the Q value. Certainly, in the actual reference, the best choice is that: the ratio of the dimension of the inner wall of the cavity to the corresponding dimension of the dielectric resonator corresponding to the three axial directions is 1.01-4.5. While the dimension of the cavity 1 and the frequency of the fundamental mode are kept unchanged, and the dimension of one of the axial dielectric resonators and the axial dimension in the vertical direction are changed in any combinations, the fundamental mode of the single axial dielectric resonant structure may form 1-3 multi-modes with the same frequency, and the fundamental mode of the vertically intersected biaxial dielectric resonant structure and the triaxial intersected dielectric resonant structure may form 1-6 multi-modes with the same frequency, if the ratio of the corresponding cavity dimension to the dimensions of the one axial dielectric resonator and the other one or two axial dielectric resonators or the three axial dielectric resonators is changed, the corresponding number of the fundamental modes may also be changed accordingly.

The value range of K1 of the single axial dielectric resonant structure or the vertically intersected biaxial dielectric resonant structure or the triaxial intersected dielectric resonant structure is $1.01<K1<4.5$, the value range of K2 is $1.01<K2<4.5$, and $K1 \leq K \leq K2$; while the high-Q multi-mode dielectric resonant structure is the single axial, vertically intersected biaxial and triaxial intersected high-Q multi-mode dielectric resonant structures, and while the K value and the M value are changed, the number of the fundamental modes with the close frequency is defined as L, and the number of the adjacent high-order modes with the close frequency is N, and the fundamental modes with the different frequencies and the adjacent high-order modes are combined into L+N mode resonance combinations, herein $1 \leq L \leq 6$, the number of L is related to dimension combinations of the cavity 1, the dielectric support frame 2, and the dielectric resonator, the frequency of the high-order mode is higher than that of the fundamental mode, and the number of the high-order modes is related to the different interval combinations of the frequencies of the high-order mode.

In the high-Q multi-mode dielectric resonant structure, while the fundamental mode frequency is kept unchanged, the resonance numbers of L+N or L modes of the fundamental modes with the same frequency or the different frequencies and the adjacent high-order modes in the single axial high-Q multi-mode dielectric resonant structure is smaller than that of the vertically intersected biaxial high-Q multi-mode dielectric resonant structure, and the number of L+N or L modes of the fundamental modes with the same frequency or the different frequencies and the adjacent high-order modes in the vertically intersected biaxial resonant structure is smaller than that of the triaxial intersected high-Q multi-mode dielectric resonant structure.

Please refer to FIGS. 4 to 7. The dielectric support frame 2 is located at the end face, the edge, and the sharp corner of the dielectric resonator 3 or the sharp corner of the cavity, and placed between the dielectric resonator 3 and the cavity, the dielectric resonator 3 is supported in the cavity by the dielectric support frame 2, and while the dielectric support frame 2 is mounted in the different positions of the dielectric resonator 3, the corresponding fundamental mode and multi-mode number, the frequency, and the Q value thereof may also be changed accordingly. The dielectric support frame 2 includes the solid with two parallel surfaces or the structure in which the middle is penetrated, and the number of the dielectric support frame 2 on the same end face or the different end faces, the edge, and the sharp corner of the dielectric resonator 3 is one or a plurality of different combinations, the frequencies, the mode numbers and the Q values corresponding to the different numbers of the dielectric support frames 2 may also be different.

The dielectric support frame 2 and the dielectric resonator 3 or the cavity 1 are combined to form the integrated structure or the split structure. The dielectric support frame 2 is connected with the dielectric resonator 3 and the cavity 1 by means of press-connecting, bonding, splicing, welding, snap-fitting or screw-fastening, and the dielectric support frame 2 is connected to one or more end faces of the one single axial dielectric resonator 3 or the two vertically intersected single axial dielectric resonators 3 or the three mutually vertically intersected single axial dielectric resonators 3, the dielectric or metal connecting block is used to fix the cut small dielectric resonator block by means of the press-connecting, bonding, splicing, welding, snap-fitting or screw-fastening, a plurality of the small dielectric resonator blocks with arbitrary shapes is connected to form the dielectric resonator 3 by the connecting block.

Herein the dielectric support frame 2 of the one single axial dielectric resonator 3 or the two vertically intersected single axial dielectric resonators 3 or the three mutually vertically intersected single axial dielectric resonators 3 is made of the dielectric material, the material of the dielectric support frame 2 is an air, plastic or ceramic, composite dielectric material, and the connecting block may be a dielectric or metal material.

Herein an elastic spring sheet or an elastic dielectric material for stress relief is arranged between the dielectric support frame 2 of the one single axial dielectric resonator 3 or two vertically intersected single axial dielectric resonators 3 or the three mutually vertically intersected single axial dielectric resonators 3 and the inner wall of the cavity 1.

Herein, the dielectric support frame 2 of the dielectric resonator 3 is in contact with the inner wall of the cavity 1 to form heat conduction. In the signal axial dielectric high-Q multi-mode dielectric resonant structure, the vertically intersected biaxial high-Q multi-mode dielectric resonant structure or the triaxial intersected high-Q multi-mode dielectric resonant structure: after a radio frequency signal passes through a radio frequency channel formed by coupling between the X-axis and Y-axis resonances or a radio frequency channel formed by X and Y coupling and Y and Z coupling between the X-axis, Y-axis and Z-axis resonances, loss and heat may be produced, the heat produced in working of the degenerate-state mode in arbitrary two or three directions of X, Y or Z-axis are adequately in contact with the inner walls at two sides of the cavity 1 in X, Y or Z-axis directions to form the heat conduction through the dielectric support frame 2, thereby the heat generation of a product is reduced.

The heat may produce thermal expansion and cold contraction, the pass band offset is caused, the pass band offset caused by the high-low temperature is reduced by adjusting the material ratio of the dielectric resonator and the dielectric support frame 2, or the pass band offset caused by the high-low temperature is reduced by changing the dimension combination of the dielectric resonator and the cavity 1.

The embodiment of the present invention further provides a dielectric filter including the high-Q multi-mode dielectric resonant structure, including the high-Q multi-mode dielectric resonant structure as shown in the above embodiments. Specifically, it may be a single axial high-Q multi-mode dielectric resonant structure, a vertically intersected biaxial high-Q multi-mode dielectric resonant structure or a triaxial intersected high-Q multi-mode dielectric resonant structure; the cavity corresponding to the single axial high-Q multi-mode dielectric resonant structure, the vertically intersected biaxial high-Q multi-mode dielectric resonant structure or the triaxial intersected high-Q multi-mode dielectric resonant structure is combined with the single-mode resonant cavity, the double-mode resonant cavity and the three-mode resonant cavity in different forms, as to form the different dimensions of the single-pass band or multi-pass band filters, the duplexers and the multiplexers required.

In the single axial high-Q multi-mode dielectric resonant structure, the cavity corresponding to the single axial resonator is arbitrarily combined with the single-mode resonant cavity to form the single-pass band multi-mode filter, the duplexer and the multiplexer.

While the fundamental mode of the vertically intersected biaxial high-Q multi-mode dielectric resonant structure is the double-mode, and the adjacent high-order mode is the single-mode and the multi-mode, the cavity corresponding to the vertically intersected biaxial resonator is arbitrarily combined with the single-mode resonant cavity to form the different frequency bands of the double-pass band filters, the duplexers and the multiplexers.

While the fundamental mode of the triaxial intersected high-Q multi-mode dielectric resonant structure is the three-mode, the corresponding cavity is arbitrarily combined with the single-mode resonant cavity to form the three-mode filter or the duplexer and the multiplexer, and while the adjacent high-order mode and the adjacent higher-order mode are the multi-mode, the cavity corresponding to the triaxial intersected resonator is arbitrarily combined with the cavity to form the different frequency bands of the multi-mode multi-pass band filters, the duplexers and the multiplexers.

The double-mode and multi-mode resonant structures formed in the X, Y, and Z-axis directions are arbitrarily combined with the single-mode resonant cavity, the double-mode resonant cavity and the three-mode resonant cavity in the different forms, as to form the different dimensions of the filters, the dielectric resonant cavity corresponding to the combined filter selects the different K values and M values according to the requirements to change the frequency spacing between the fundamental mode and the adjacent high-order mode, or increase or decrease the frequency spacing between the adjacent high-order mode and the fundamental mode thereof through the combination with the cavity 1.

The functional characteristics of the filter include but are not limited to band pass, band stop, high pass, low pass and the duplexer, combiner, and multiplexer formed by them mutually.

The device embodiments described above are only illustrative, herein a unit described as a separate component may or may not be physically separated, and a component shown as the unit may or may not be a physical unit, namely it may be located in one place, or distributed to a plurality of network units. Some or all of modules may be selected according to actual needs to achieve the purpose of the scheme in this embodiment. Those of ordinary skill in the art may understand and implement it without creative work.

Finally, it should be noted that the above embodiments are only used to describe the technical schemes of the present invention, but not to limit it; although the present invention is described in detail with reference to the foregoing embodiments, those of ordinary skill in the art should understand that: it may still perform modifications on the technical schemes recorded in the foregoing embodiments, or perform equivalent replacements on some technical features thereof; and these modifications or replacements do not make the essence of the corresponding technical schemes depart from the spirit and scope of the technical schemes of the embodiments of the present invention.

INDUSTRIAL APPLICABILITY

The embodiment of the present invention discloses a high-Q multi-mode dielectric resonant structure and a dielectric filter, it includes a cavity, a dielectric support frame, a dielectric resonator and a cover plate, and the cavity is formed by a sealed space, herein one surface of the cavity is a cover plate surface; the dielectric resonator is formed by a medium; and the dielectric support frame is mounted in any positions between the dielectric resonator and an inner wall of the cavity, matched with any shapes of the dielectric resonator and the cavity and fixed by connecting, and the ratio of the dimension of the inner wall of the cavity to the corresponding dimension of the dielectric resonator corresponding to three axial directions thereof is between 1.01-4.5. Embodiments of the present invention may solve a scheme that the filter is small in volume, low in insertion loss, and high in suppression, and may form a multi-mode, and a Q value is greater than that of a traditional dielectric multi-mode technology.

What is claimed is:

1. A high-Q multi-mode dielectric resonant structure, comprising a cavity, a dielectric support frame, a dielectric resonator and a cover plate; the cavity is formed by a sealed space, wherein one surface of the cavity is a cover plate surface; the dielectric resonator is formed by a medium; the dielectric resonator is mounted in the cavity without contacting an inner wall of the cavity; the dielectric support frame is mounted in any positions between the dielectric resonator and the inner wall of the cavity, matched with any shapes of the dielectric resonator and the cavity and fixed by connecting, wherein the dielectric resonator comprises an integrated dielectric resonator or a split dielectric resonator formed by a plurality of split small dielectric resonant blocks and fixed by connecting blocks, the cavity is internally provided with one single axial cylindrical or polygonal dielectric resonator and the fixed dielectric support frame thereof to form a multi-mode dielectric resonant structure with the cavity; or the cavity is internally provided with two vertically intersected cylindrical or polygonal single axial dielectric resonators and the fixed dielectric support frame thereof to form a multi-mode dielectric resonant structure with the cavity, wherein the X-axis dimension of the cylindrical or polygonal dielectric resonator on a X-axial direction is greater than or equal to the perpendicular dimension, parallel to a X-axis, of the cylindrical or polygonal dielectric resonator with a Y-axis; and wherein the Y-axis dimension of the cylindrical or polygonal dielectric resonator on a Y-axis direction is greater than or equal to the perpendicular dimension, parallel to the Y-axis, of the cylindrical or polygonal dielectric resonator with the X-axis; or the cavity is internally provided with three mutually vertically intersected cylindrical or polygonal single axial dielectric resonators and the fixed dielectric support frame thereof to form a multi-mode dielectric resonant structure with the cavity, wherein the X-axis dimension of the cylindrical or polygonal dielectric resonator on the X-axis direction is greater than or equal to the perpendicular dimensions, parallel to the X-axis, of the cylindrical or polygonal dielectric resonator with the Y-axis and the cylindrical or polygonal dielectric resonator with the Z-axis; wherein the Y-axis dimension of the cylindrical or polygonal dielectric resonator on the Y-axis direction is greater than or equal to the perpendicular dimensions, parallel to the Y-axis, of the cylindrical or polygonal dielectric resonator with the X-axis and the cylindrical or polygonal dielectric resonator with the Z-axis; and wherein the Z-axis dimension of the cylindrical or polygonal dielectric resonator on a Z-axis direction is greater than or equal to the perpendicular dimensions, parallel to the Z-axis, of the cylindrical or polygonal dielectric resonator with the X-axis and the cylindrical or polygonal dielectric resonator with the Y-axis, while the dielectric resonant structure is the one single axial dielectric resonator, the two vertically intersected single axial dielectric resonators, or the three mutually vertically intersected single axial dielectric resonators, the dielectric resonator is trimmed, slotted and chamfered in the horizontal and vertical directions, so that the dimension of the inner wall of the cavity thereof and the dimension of the dielectric resonator corresponding to the three axial directions are changed or the dimensions in the horizontal and vertical directions are changed, so as to change frequencies of a fundamental mode and a plurality of high-order modes and the corresponding number of multi-modes and Q value, while the dielectric resonant structure is the two vertically intersected single axial dielectric resonators or the three mutually vertically intersected single axial dielectric resonators, and the dimension of the cylindrical or polygonal dielectric resonator on any one axial direction is less than the perpendicular dimension, parallel to the axial direction, of the cylindrical or polygonal dielectric resonators with other one or two axial, the frequencies of the corresponding fundamental mode and the plurality of the high-order modes thereof and the corresponding number of multi-modes and the Q value can be changed accordingly, while the frequency of the fundamental mode is kept unchanged, the high-Q multi-mode dielectric resonant structure is formed by the dielectric resonators and the dielectric resonators have different dielectric constants, the cavity and the dielectric support frame, and the Q value and the number of the multi-mode corresponding to the frequencies of the fundamental mode and the plurality of the high-order modes can be changed, the changes of the Q values of the dielectric resonators with the different dielectric constants are different, and the frequency of the high-order mode can also be changed, the ratio of the dimension of the inner wall of the cavity to the dimension of the dielectric resonator corresponding to the three axial directions thereof or the ratio of the dimensions in the horizontal and vertical directions is between 1.01-4.5, wherein a change relationship of the Q value change with the ratio of the dimension of the inner wall of the cavity to the dimension of the dielectric resonator corresponding to the three axial directions thereof or with the ratio 1.01-4.5 of the dimensions in the horizontal and vertical directions is that the Q value is directly proportional to the change of the dimension ratio or the Q value is proportional to the change of the dimension ratio and the Q value has a larger change near a certain ratio, and the changes of the multi-mode Q values corresponding to the different frequencies are different near a certain ratio.

2. The high-Q multi-mode dielectric resonant structure according to claim 1, wherein when the cavity is internally provided with one single axial cylindrical or polygonal dielectric resonator and the fixed dielectric support frame thereof to form a multi-mode dielectric resonator with the cavity, a center of an end face of the dielectric resonator is close to or coincided with a position, corresponding to a center of an inner wall surface, of the cavity, the dielectric resonator thereof is trimmed, slotted and chamfered in the horizontal and vertical directions, the inner wall dimension of the cavity and the dimension of the dielectric resonator corresponding to the three axial directions are changed or the dimensions in the horizontal and vertical directions are changed, it can change the Q value and the number of multi-mode corresponding to the frequencies of the fundamental mode and the plurality of the high-order modes, while the X-axis, Y-axis, and Z-axis dimensions of the inner wall of the cavity are changed, the X-axis, Y-axis, and Z-axis dimensions of the dielectric resonator corresponding to the inner wall of the cavity can also be changed accordingly while at least one desired frequency is kept unchanged, when the cavity is internally provided with two vertically intersected single axial cylindrical or polygonal dielectric resonators and the fixed dielectric support frame thereof to form a multi-mode dielectric resonant structure with the cavity, the center of the end face of the dielectric resonator is closed to or coincided with the position, corresponding to the center of the inner wall surface, of the cavity, wherein the X-axis dimension of the cylindrical or polygonal dielectric resonator on the X-axis direction is greater than or equal to the perpendicular dimension, parallel to the X-axis, of the cylindrical or polygonal dielectric resonator with the Y-axis; wherein the Y-axis dimension of the cylindrical or polygonal dielectric resonator on the Y-axis direction is greater than or equal to the perpendicular dimension, parallel to the Y-axis, of the cylindrical or polygonal dielectric resonator with the X-axis; and the dielectric resonator is trimmed, slotted and chamfered in the horizontal and vertical directions, the inner wall dimension of the cavity thereof and the dimension of the dielectric resonator corresponding to the three axial directions are changed or the dimensions in the horizontal and vertical directions are changed, so as to change the Q value and the number of multi-mode corresponding to the frequencies of the fundamental mode and the plurality of the high-order modes, while the X-axis, Y-axis and Z-axis dimensions of the inner wall of the cavity is changed, the X-axis, Y-axis and Z-axis dimensions of the dielectric resonator corresponding to the inner wall of the cavity can also be changed accordingly while a desired frequency is kept unchanged, when the cavity is internally provided with three mutually vertically intersected single axial cylindrical or polygonal dielectric resonators and the fixed dielectric support frame thereof to form a multi-mode dielectric resonant structure with the cavity, the center of the end face of the dielectric resonator is close to or coincided with the position, corresponding to the center of the inner wall surface, of the cavity, wherein the X-axis dimension of the cylindrical or polygonal dielectric resonator on the X-axis direction is greater than or equal to the perpendicular dimensions, parallel to the X-axis, of the cylindrical or polygonal dielectric resonator with the Y-axis and the cylindrical or polygonal dielectric resonator with the Z-axis; wherein the Y-axis dimension of the cylindrical or polygonal dielectric resonator on the Y-axis direction is greater than or equal to the perpendicular dimensions, parallel to the Y-axis, of the cylindrical or polygonal dielectric resonator with the X-axis and the cylindrical or polygonal dielectric resonator with the Z-axis; wherein the Z-axis dimension of the cylindrical or polygonal dielectric resonator on the Z-axis direction is greater than the perpendicular dimensions, parallel to the Z-axis, of the cylindrical or polygonal dielectric resonator with the X-axis and the cylindrical or polygonal dielectric resonator with the Y-axis; and the dielectric resonator is trimmed, slotted and chamfered in the horizontal and vertical directions, the dimension of the inner wall of the cavity thereof and the dimension of the dielectric resonator corresponding to the three axial directions are changed or the dimensions in the horizontal and vertical directions are changed, it can change the Q value and the number of multi-mode corresponding to the frequencies of the fundamental mode and the plurality of the high-order modes, while the X-axis, Y-axis, and Z-axis dimensions of the inner wall of the cavity are changed, the X-axis, Y-axis, and Z-axis dimensions of the dielectric resonator corresponding to the inner wall of the cavity can also be changed accordingly while a desired frequency is kept unchanged, and the ratio of the dimension of the inner wall of the cavity to the dimension of the dielectric resonator corresponding to the three axial directions thereof or the ratio of the dimensions in the horizontal and vertical directions is between 1.01-4.5.

3. The high-Q multi-mode dielectric resonant structure according to claim 1, wherein the one single axial dielectric resonant structure or the two vertically intersected single axial dielectric resonant structures or the three mutually vertically intersected single axial dielectric resonant structures can be through-slotted or blind-slotted along any axis, plane, slope and diagonal, and can be cut into different numbers of small dielectric resonator blocks, and the small dielectric resonator blocks can be fixed to form a dielectric resonator through dielectric or metal connecting block, or it can be blind-cut so that the dielectric resonator is integrally connected between the adjacent small dielectric resonator blocks, a slot width of a through slot and a blind slot is larger, the influence thereof on the frequency, the Q value and the mode number is greater, and the slot width is smaller, the influence thereof on the frequency, the Q value and the mode number is smaller, while the connecting block is made of metal, the Q value of the formed split dielectric resonator can be greatly reduced, while the ratio of the dimension of the inner wall of the cavity to the dimension of the dielectric resonator corresponding to the three axial directions thereof or the ratio of the dimensions in the horizontal and vertical directions is between 1.01-4.5, the mode number corresponding to the frequencies of the fundamental mode and the high-order mode is 1-N, the multi-mode Q value corresponding to the different frequencies of the fundamental mode and high-order mode can be changed, and the dielectric resonators with different dielectric constants can affect the change of the frequency, the Q value, and the mode number thereof, while the dimension ratio between the cavity and one axial dielectric resonator or the other one or two axial dielectric resonators or three axial dielectric resonators is changed, the corresponding fundamental mode and multi-mode number, the frequency, and the Q value can also be changed accordingly.

4. The high-Q multi-mode dielectric resonant structure according to claim 3, wherein in the one single axial dielectric resonant structure or the two vertically intersected single axial dielectric resonant structures or the three mutually vertically intersected single axial dielectric resonant structures, while the ratio of the dimension of the inner wall of the cavity to the dimension of the dielectric resonator corresponding to the three axial directions thereof or the ratio of the dimensions in the horizontal and vertical directions is between 1.01-4.5, the Q valve and the number of the multi-mode corresponding to the frequencies of the fundamental mode and a plurality of the high-order modes can be changed, and the Q values of the dielectric resonators with the different dielectric constants are different, wherein the change relationship of the Q value change with the ratio of the dimension of the inner wall of the cavity to the dimension of the dielectric resonator corresponding to the three axial directions thereof or with the ratio 1.01-4.5 of the dimensions in the horizontal and vertical directions is that the Q value is directly proportional to the change of the dimension ratio or the Q value is proportional to the change of the dimension ratio and the Q value has a larger change near certain specific ratios, and the changes of the multi-mode Q values corresponding to the different frequencies are different near certain specific ratios, while the dimension ratio between the cavity and one axial dielectric resonator or the other one or two axial dielectric resonators or three axial dielectric resonators is changed, the corresponding fundamental mode Q value can also be changed accordingly.

5. The high-Q multi-mode dielectric resonant structure according to claim 3, wherein in the one single axial dielectric resonant structure or the two vertically intersected single axial dielectric resonant structures or the three mutually vertically intersected single axial dielectric resonant structures, while the ratio of the dimension of the inner wall of the cavity to the dimension of the dielectric resonator corresponding to the three axial directions thereof or the ratio of the dimensions in the horizontal and vertical directions is between 1.01-4.5, while the fundamental mode frequency thereof is kept unchanged, the high-order mode frequency and the fundamental mode frequency, and an interval between the frequencies of the plurality of the high-order modes can be changed for many times, and the changes of the interval of the frequencies of the dielectric resonators with the different dielectric constants are different, while the dimension ratio between the cavity and one axial dielectric resonator or the other one or two axial dielectric resonators or three axial dielectric resonators is changed, the corresponding fundamental mode and multi-mode frequency intervals can also be changed accordingly.

6. The high-Q multi-mode dielectric resonant structure according to claim 1, wherein in the one single axial dielectric resonant structure or the two vertically intersected single axial dielectric resonant structures or the three mutually vertically intersected single axial dielectric resonant structures, while the ratio of the dimension of the inner wall of the cavity to the dimension of the dielectric resonator corresponding to the three axial directions thereof or the ratio of the dimensions in the horizontal and vertical directions is between 1.01-4.5, while the cavity dimension and the fundamental mode frequency are kept unchanged, and the horizontal and vertical dimensions of the three axial dimensions of the single axial dielectric resonator are changed in any combinations, the fundamental mode of the single axial dielectric resonant structure can form the 1-3 multi-modes with the same frequency or close frequencies, and the plurality of the high-order modes with the different frequencies forms 1-N multi-modes at the same frequency; the fundamental mode of the vertically intersected biaxial dielectric resonant structure and the triaxial intersected dielectric resonant structure can form 1-6 multi-modes with the same frequency or close frequencies, and the plurality of the high-order modes with the different frequencies forms 1-N multi-modes at the same frequency, while dimension ration between the cavity and one axial dielectric resonator or the other one or two axial dielectric resonators or three axial dielectric resonators is changed, the corresponding fundamental mode and multi-mode number can also be changed accordingly.

7. The high-Q multi-mode dielectric resonant structure according to claim 1, wherein an edge or a sharp corner of the dielectric resonator or/and the cavity is provided with a cut side to form adjacent coupling, and the cavity and the dielectric resonator is cut into a triangle or a quadrilateral, or partial or whole edge cutting is performed at the edge of the cavity or the dielectric resonator, the cavity and the dielectric resonator are side-cut at the same time or side-cut separately, and after the adjacent coupling is formed by the side-cutting, the frequency and the Q value can be changed accordingly, and the adjacent coupling can also affect cross coupling thereof.

8. The high-Q multi-mode dielectric resonant structure according to claim 1, wherein a sharp corner position at the intersection of three surfaces of the cavity corresponding to the one single axial dielectric resonator or the two vertically intersected single axial dielectric resonators or the three mutually vertically intersected single axial dielectric resonators is corner-cut and/or the cavity is corner-cut and closed to form cross coupling, and the corresponding frequency and Q value can also be changed accordingly, and it can also affect the adjacent coupling.

9. The high-Q multi-mode dielectric resonant structure according to claim 1, wherein at least one tuning device is arranged in a position in which the field strength of the dielectric resonator is concentrated.

10. The high-Q multi-mode dielectric resonant structure according to claim 9, wherein the cavity material is metal or non-metal, and the surfaces of the metal and non-metal are electro-plated with copper or electro-plated with silver.

11. The high-Q multi-mode dielectric resonant structure according to claim 1, wherein the shape of the cavity corresponding to the one single axial dielectric resonant structure or the two vertically intersected single axial dielectric resonant structures or the three mutually vertically intersected single axial dielectric resonant structures comprises, at least one of the following: a cuboid, a cube, and a polygon, and the inner wall surface of the cavity or a part of an inner region can be provided with a concave or a convex or a cut corner or a slot.

12. The high-Q multi-mode dielectric resonant structure according to claim 1, wherein the cross-sectional shape of the one single axial dielectric resonator or the two vertically intersected single axial dielectric resonators or the three mutually vertically intersected single axial dielectric resonators comprises, at least one of the following: a cylinder, an ellipsoid, and a polygon.

13. The high-Q multi-mode dielectric resonant structure according to claim 1, wherein the surface or the inner region of the dielectric resonator can be partially provided with a concave or a convex or a cut corner or a slot or an edge.

14. The high-Q multi-mode dielectric resonant structure according to claim 1, wherein the one single axial dielectric resonator or the two vertically intersected single axial dielectric resonators or the three mutually vertically intersected single axial dielectric resonators are solid or hollow.

15. The high-Q multi-mode dielectric resonant structure according to claim 1, wherein the dielectric resonator material is a ceramic, a composite dielectric material, or a dielectric material with a dielectric constant greater than 1.

16. The high-Q multi-mode dielectric resonant structure according to claim 1, wherein the dielectric support frame is located at the end face, the edge, and the sharp corner of the dielectric resonator or the sharp corner of the cavity, and is placed between the dielectric resonator and the cavity, the dielectric resonator is supported in the cavity by the dielectric support frame, while the dielectric support frame is mounted in different positions of the dielectric resonator, the corresponding fundamental mode and multi-mode number, the frequency and the Q value thereof can also be changed accordingly, the connecting block can connect any two or more adjacent small dielectric resonator blocks, the connecting block is located at any positions of the small dielectric resonator block, and the different numbers of the small dielectric resonator blocks can be fixed to form the dielectric resonator, and while the connecting block is located at the different positions of the dielectric resonator, the corresponding fundamental mode and multi-mode number, the frequency, and the Q value can also be changed accordingly, while the ratio of the dimension of the inner wall of the cavity to the dimension of the dielectric resonator corresponding to the three axial directions thereof or the ratio of the dimensions in the horizontal and vertical directions is between 1.01-4.5, the Q values of the fundamental mode and the high-order mode are changed for many times, while the dimension ratio between the cavity and one axial dielectric resonator or the other one or two axial dielectric resonators or the three axial dielectric resonators is changed, the frequencies of the corresponding fundamental mode and the plurality of the high-order modes and the corresponding multi-mode number and Q value can also be changed accordingly.

17. The high-Q multi-mode dielectric resonant structure according to claim 16, wherein the dielectric support frame of the one single axial dielectric resonator or the two vertically intersected single axial dielectric resonators or the three mutually vertically intersected single axial dielectric resonators is made of the dielectric material, the material of the dielectric support frame is an air, plastic or ceramic, composite dielectric material, and the connecting block can be a dielectric or metal material.

18. The high-Q multi-mode dielectric resonant structure according to claim 16, wherein the dielectric support frame is connected with the dielectric resonator and the cavity by means of press-connecting, bonding, splicing, welding, snap-fitting or screw-fastening, and the dielectric support frame is connected to one or more end faces of the one single axial dielectric resonator or the two vertically intersected single axial dielectric resonators or the three mutually vertically intersected single axial dielectric resonators, the dielectric or metal connecting block is used to fix the cut small dielectric resonator block by means of the press-connecting, bonding, splicing, welding, snap-fitting or screw-fastening, a plurality of the small dielectric resonator blocks with arbitrary shapes is connected to form the dielectric resonator by the connecting block.

19. The high-Q multi-mode dielectric resonant structure according to claim 1, wherein the dielectric support frame and the dielectric resonator or the cavity are combined to form an integrated structure or a split structure.

20. The high-Q multi-mode dielectric resonant structure according to claim 1, wherein:

the dielectric support frame is mounted at any positions corresponding to the dielectric resonator and the inner wall of the cavity and matched with any shapes of the dielectric resonator and the cavity and is fixed by connecting, the dielectric support frame comprises a solid with two parallel surfaces or a structure of which the middle is penetrated, and the number of the dielectric support frames at the same end face or different end faces, edges and sharp corners of the dielectric resonator is one or more different combinations, and the corresponding frequencies, mode number and Q value of the different numbers of the dielectric support frame can also be different, while the ratio of the dimension of the inner wall of the cavity to the dimension of the dielectric resonator corresponding to the three axial directions thereof or the ratio of the dimensions in the horizontal and vertical directions is between 1.01-4.5, the Q values of the fundamental mode and the high-order mode can be changed for many times, the connecting block is any shapes and is matched and mounted between two or more adjacent small dielectric resonator blocks, so that the plurality of the small dielectric resonator blocks is connected and fixed to form a split dielectric resonator, and the connecting block comprises a solid or a structure of which the middle is penetrated, and the number of the connecting blocks at the same end face or different end faces, edges and sharp corners of the dielectric resonator is one or more different combinations, and the corresponding frequencies, mode number and Q value of the different numbers of the connecting blocks can also be different, while the ratio of the dimension of the inner wall of the cavity to the dimension of the dielectric resonator corresponding to the three axial directions thereof or the ratio of the dimensions in the horizontal and vertical directions is between 1.01-4.5, the Q values of the fundamental mode and the high-order mode can be changed for many times, while the dimension ratio between the one single axial dielectric resonator or the other one or two axial dielectric resonators or the three axial dielectric resonators is changed, the frequencies of the corresponding fundamental mode and the plurality of the high-order modes and the corresponding multi-mode number and Q value can be changed accordingly.

21. The high-Q multi-mode dielectric resonant structure according to claim 1, wherein an elastic spring sheet or an elastic dielectric material for stress relief is arranged between the dielectric support frame of the one single axial dielectric resonator or two vertically intersected single axial dielectric resonators or the three mutually vertically intersected single axial dielectric resonators and the inner wall of the cavity.

22. The high-Q multi-mode dielectric resonant structure according to claim 1, wherein the dielectric support frame of the dielectric resonator is in contact with the inner wall of the cavity to form heat conduction.

23. A dielectric filter comprising the high-Q multi-mode dielectric resonant structure according to claim 1: a single axial dielectric high-Q multi-mode dielectric resonant structure, a vertically intersected biaxial high-Q multi-mode dielectric resonant structure or a vertically intersected triaxial high-Q multi-mode dielectric resonant structure can form 1-N single pass band filters with different frequencies, and the single pass band filters with the different frequencies form a multi-pass band filter, a duplexer or an arbitrary combination of a multiplexer, the corresponding high-Q multi-mode dielectric resonant structure can also be arbitrarily combined in different forms with a single-mode resonant cavity, a double-mode resonant cavity and a three-mode resonant cavity of metal or dielectric, so as to form the different dimensions of a plurality of the single pass band or multi-pass band filters or the duplexers or arbitrary combines of the multiplexers required.

24. The dielectric filter according to claim 23, wherein the cavity corresponding to the single axial dielectric high-Q multi-mode dielectric resonant structure, the vertically intersected biaxial high-Q multi-mode dielectric resonant structure or the vertically intersected triaxial high-Q multi-mode dielectric resonant structure can perform arbitrary combines of adjacent coupling or cross coupling with the metal resonator single mode or multi-mode cavity, and the dielectric resonator single mode or multi-mode cavity.

* * * * *